(12) United States Patent
Mok et al.

(10) Patent No.: US 7,656,791 B1
(45) Date of Patent: Feb. 2, 2010

(54) SYSTEMS AND METHODS FOR HITLESS EQUIPMENT PROTECTION

(75) Inventors: Winston Ki-Cheong Mok, Vancouver (CA); Pascal Routhier, Montreal (CA)

(73) Assignee: PMC-Sierra, Inc., Santa Clara, CA (US)

( * ) Notice: Subject to any disclaimer, the term of this patent is extended or adjusted under 35 U.S.C. 154(b) by 241 days.

(21) Appl. No.: 11/780,361

(22) Filed: Jul. 19, 2007

Related U.S. Application Data

(60) Provisional application No. 60/831,910, filed on Jul. 19, 2006.

(51) Int. Cl.
G01R 31/08 (2006.01)

(52) U.S. Cl. .................................. 370/225; 370/395.51

(58) Field of Classification Search ........................ None
See application file for complete search history.

(56) References Cited

U.S. PATENT DOCUMENTS

| | | | |
|---|---|---|---|
| 4,477,895 A | 10/1984 | Casper et al. | |
| 4,686,675 A | 8/1987 | Morimoto et al. | |
| 5,051,979 A | 9/1991 | Chaudhuri et al. | |
| 5,285,441 A | 2/1994 | Bansal et al. | |
| 5,577,196 A | 11/1996 | Peer | |
| 5,631,896 A | 5/1997 | Kawase et al. | |
| 5,825,821 A | 10/1998 | Okuyama | |
| 6,246,668 B1* | 6/2001 | Kusyk | 370/228 |
| 6,515,962 B1 | 2/2003 | Sawey et al. | |
| 6,704,890 B1* | 3/2004 | Carotti et al. | 714/700 |
| 6,754,172 B1 | 6/2004 | Tanaka et al. | |
| 6,795,393 B1 | 9/2004 | Mazzurco et al. | |
| 6,891,863 B1* | 5/2005 | Penkler et al. | 370/539 |
| 6,963,560 B2* | 11/2005 | Sawey et al. | 370/353 |
| 7,035,292 B1* | 4/2006 | Giorgetta et al. | 370/509 |
| 7,075,951 B1* | 7/2006 | McClary | 370/528 |
| 7,173,930 B2* | 2/2007 | Wellbaum et al. | 370/356 |
| 2003/0227988 A1* | 12/2003 | Subrahmanyan et al. | 375/372 |
| 2005/0286521 A1* | 12/2005 | Chiang et al. | 370/389 |
| 2006/0126500 A1* | 6/2006 | Wakai et al. | 370/218 |

* cited by examiner

*Primary Examiner*—Phirin Sam
(74) *Attorney, Agent, or Firm*—Knobbe Martens Olson & Bear LLP

(57) ABSTRACT

Disclosed techniques include a method and apparatus that allow traffic to be switched between a working copy and a protected copy hitlessly. The control method simplifies implementation by advantageously distinguishing points within the apparatus wherein the working and protect streams should be virtually identical and aligned and points where the streams need only be identical but are tolerant of skew.

17 Claims, 19 Drawing Sheets

SYSTEMS AND METHODS FOR HITLESS EQUIPMENT PROTECTION

CROSS-REFERENCE TO RELATED APPLICATIONS

This application claims the benefit under 35 U.S.C. §119 (e) of U.S. Provisional Application No. 60/831,910, filed Jul. 19, 2007, the entirety of which is hereby incorporated by reference.

BACKGROUND OF THE INVENTION

1. Field of the Invention

Embodiments of the invention are applicable to any data communications equipment with one or more redundant copies of components. For example, embodiments of the invention can be used to switch the active data path from one copy to another without introducing any bit errors.

2. Description of the Related Art

Synchronous optical networking (SONET) and synchronous digital hierarchy (SDH) networks have been widely deployed as the primary optical network in the telecommunications infrastructure globally. In this disclosure, SONET terminology is used. Since SDH networks have largely equivalent terms, the concepts disclosed are easily converted to SDH equipment. The basic SONET STS-1 transport frame is shown in FIG. 1. Each frame includes 9 rows and 90 columns of bytes, and is transmitted once every 125 microseconds, at a bit rate of 51.84 Mbps. The first three columns are the transport overhead—TOH bytes. The remaining 87 bytes are the Synchronous Payload Envelope—SPE. Bytes are generally labeled by their offset relative to the H1, H2 pointer bytes. The payload frame has 9 rows and 87 columns of bytes. The first column of the payload frame is the Path Overhead—POH bytes. The payload frame begins at the J1 bytes and floats within the transport frame and can, therefore, straddle two transport frames. The beginning of the transport frame is located by the H1, H2 pointer bytes.

A number of STS-1 streams can be multiplexed together to form a higher rate signal. The constituent STS-1 streams are first frame aligned to a common transport frame alignment by an STS payload processor (shown in FIG. 2), which includes a Pointer Interpreter, a FIFO buffer, and a Pointer Generator. Then, the aligned STS-1 streams are byte interleaved to form an STS-N stream. The number of STS-1 streams that can be interleaved to form an STS-N stream is limited to N=3, 12, 48, 192, and 768. The resultant STS-N stream has a bit rate that is N times that of an STS-1 stream. It should be noted that the constituent STS-1 streams are typically independent and can have arbitrary alignment and slightly different bit rates. Consequently, a SONET multiplexer tends to establish an independent bit rate for the resultant STS-N stream. The payload processor uses STS-1 pointer justifications to adapt between the incoming STS-1 alignment and rate to the resultant STS-N alignment and rate. Often, the decision of what type (positive or negative) pointer justification and which frame to insert it, is based on the current depth of the FIFO associated with each constituent STS-1 stream.

An STS-1 stream can be further sub-divided into a number of virtual tributaries—VT. Four virtual tributaries types are defined, VT1.5, VT2, VT3 and VT6. The frame format of a virtual tributary is shown in FIG. 3. The bytes labeled V1 to V4 are VT transport overhead bytes and bytes V5, J2, Z6 and Z7 are VT path overhead bytes. As with STS-1 frames, the payload frame of a VT floats within a VT transport frame and is located by the V1, V2 pointer bytes. Multiplexing virtual tributaries together into an STS-1 SPE typically requires the constituent VTs to be aligned to a common VT transport frame alignment by a VT payload processor. The VT payload processor also converts incoming STS-1 and VT pointer justifications into a combined set of VT pointer justifications. As with STS-1 pointer processors, the decision of what type (positive or negative) of pointer justification and which frame to insert it, is often based on the current FIFO depth of each constituent VT stream. The structure of a VT payload processor (VTPP) is logically identical to that of an STS payload processor (shown in FIG. 2).

FIG. 4 shows a typical piece of SONET equipment; a SONET network element (SONET NE). Traffic is carried by two independent sets of fibers. In a Linear 1+1 Protection scheme, or a Unidirectional Path-Switch Ring (UPSR), the fibers carry identical traffic and are called the working fiber and the protect fiber. In a Bidirectional Line-Switched Ring (BLSR), portions of the bandwidth in each fiber are reserved to carry Protection traffic. In the event of one of the fibers or the associated framer experiencing a failure, the SONET equipment can send and receive data using the other fiber and framer. Schemes that protect against fiber and framer failures are called facility protection schemes. Due to the large differences in distance in the path taken by the working path and the protect path, switching between the two paths hitlessly typically requires large amounts of memory to compensate for the relative delays in arrival times. This problem of facility protection is the subject of many issued patents. See, for example, U.S. Pat. No. 4,477,895 to Casper, et al.; U.S. Pat. No. 4,686,675 to Morimoto, et al.; U.S. Pat. No. 5,051,979 to Chaudhuri, et al; U.S. Pat. No. 5,285,441 to Bansal, et al.; U.S. Pat. No. 5,577,196 to Peer, et al.; U.S. Pat. No. 5,631,896 to Kawase, et al.; U.S. Pat. No. 5,825,821 to Okuyama; U.S. Pat. No. 6,246,668 to Kusyk; U.S. Pat. No. 6,515,962 to Sawey, et al; U.S. Pat. No. 6,754,172 to Tanaka, et al; and U.S. Pat. No. 6,795,393 to Mazzurco, et al.

SUMMARY OF THE INVENTION

It is common for SONET/SDH equipment to perform Equipment protection, duplicating copies of hardware to allow for rapid recovery in the event of equipment failures. These two copies of equipment are typically identical and form a 1+1 protection pair. Traditionally, these copies are called the working copy and the protect or standby copy. The two copies are typically implemented on separate printed circuit (PC) boards and can be loosely coupled to reduce the risk of a single point of failure. When the working copy of a protected pair fails, the protect copy can be brought in to resume traffic flow with relatively minimal delay. For maintenance purposes, it is desirable to sometimes route traffic alternately over the working and the protect copies. However, this feature cannot be satisfied if each time the traffic is switched, bit errors are introduced into the data stream due to timing and state mismatches between the working copy and the protect copy.

Disclosed techniques include a method and apparatus that allow traffic to be switched between the working copy and the protected copy hitlessly. The control method simplifies implementation by advantageously distinguishing points within the apparatus wherein the working stream and the protect stream should be virtually identical and aligned, and points where the streams need only be identical but are tolerant of skew.

The disclosed method and apparatus controls two SONET streams to be virtually identical such that the path overhead bytes, virtual tributary path overhead bytes, payload bytes, H1, H2 pointer bytes and V1, V2 pointer bytes in both streams typically carry the same value, regardless of time.

Skew can be present between these identical streams. The disclosed method and apparatus can also control two virtually identical SONET streams to be aligned such that they arrive, at a point of interest, at about the same time. Virtually identical and aligned streams can be switched hitlessly using a simple 2-to-1 multiplexer.

One embodiment is an automated method of operating a working copy of a payload processor and a protect copy of a payload processor to achieve aligned data at outputs of the working copy and the protect copy even when input data to the working copy and the protect copy are skewed in time, wherein the method comprises: selecting a size of a circular buffer to corresponds to an integer factor of an incoming frame length of the input data; buffering each input port of the working copy and the protect copy with a corresponding circular buffer; writing an identifiable byte to a known location within the circular buffers; and adjusting pointers for retrieving data from the circular buffers such that the identifiable byte at the known location is read from each circular buffer at the same time, thereby aligning the data at the outputs of the working copy and the protect copy.

One embodiment is an apparatus for alignment of at least two data streams, wherein the apparatus includes: a first circular buffer of a size that is an integer factor of an incoming frame length of the input data, wherein the first circular buffer is configured to receive a first data stream, wherein the first circular buffer is in a first data path; a second circular buffer of the same size as the first circular buffer, wherein the second circular buffer is configured to receive a second data stream, wherein the second circular buffer is in a second data path; and a control circuit configured to write an identifiable byte from the receive data to a known location within the circular buffers, wherein the control circuit is further configured to manipulate pointers for retrieving data from the circular buffers such that data at the known location is read from each circular buffer at the same time, thereby aligning the data at outputs of the first data path and the second data path.

One embodiment is an apparatus for aligning data streams, wherein the apparatus includes: a working system configured to receive a first data stream from a first network equipment and a second data stream from a second network equipment, wherein the first data stream and the second data stream are not necessarily aligned in time, wherein the working system is configured to generate a third data stream from the first data stream and a fourth data stream from the second data stream such that the third data stream and the fourth data stream are time-aligned without alignment from an external timing reference; and a 2:1 multiplexer configured to select between the third data stream and the fourth data stream to generate an output, wherein the time alignment of the third data stream and the fourth data stream permits the 2:1 multiplexer to switch between the third data stream and the fourth data stream without generating a bit error.

Hit-less switching with a simple 2:1 multiplexer (MUX) that selects between two sources uses two data streams that are identical at the selection time. The MUX should see identical, aligned data. However, data need only be identical at other points in the system; data does not need to be aligned. In order for data to be identical, the STS and VT pointers in both data streams should match. This is equivalent to saying that the payload frames in both streams should have the same offset to their respective transport frames. Consequently, the FIFO depths have to be the same in the working copy and the protect copy. Disclosed is a method to ensure that the FIFOs are at the same depth automatically, without continuous coordination between the working copy and the protect copy.

One embodiment uses a circular buffer with a size that is an integer factor of the incoming frame length to compensate for skew between incoming ports that are carrying identical but unaligned traffic. The J0 byte is written into a fixed location in the buffer. The J0 location is read from the buffers within a device at the same time. This creates identical and aligned data from identical but unaligned data.

Hit-less protection when switching between the working copy and the protect copy of the STS switch fabric, Virtual Tributary Payload Processor, and VT switch fabric.

One embodiment includes specifying only 1 FIFO depth that will not generate pointer justifications. Other depths will result in either positive or negative pointer justification. In one embodiment, the state of the VTPP is a function of the incoming traffic stream received and the outgoing traffic stream processed, up to the point of measurement. One embodiment includes aligning the pointer generators in the working copy and the protect copy of the VTPP such that when state is measured they are both at the same state and ensuring that each measured state value has only one set of resulting action possible. One embodiment includes the idea of aligning the pointer generators in the working copy and the protect copy of the VTPP to take state measurements and resulting actions and schedule resulting actions relative to points in their own incoming and outgoing and outgoing traffic stream rather than at the same time, such as on a wall clock. One embodiment includes aligning the pointer generators in the working copy and the protect copy of the VTPP to generate an outgoing traffic stream with an STS payload frame with the same offset from its own STS transport frame. This ensures that both outgoing traffic streams would have the same H1/H2 pointer value. One embodiment includes using an offset monitor register in the working copy and the protect copy of the VTPP to ensure that the offset between the transport frame in the incoming and outgoing traffic streams in both copies are the same. When the offset from the incoming transport frame to the outgoing transport frame in both the working copy and the protect copy of the VTPP are the same, and the outgoing payload frame offset in both copies are configured to the same value, both the working copy and the protect copy of the VTPP should record the same FIFO state measurements if they are taken at the same point in the outgoing traffic stream.

BRIEF DESCRIPTION OF THE DRAWINGS

These drawings and the associated description herein are provided to illustrate specific embodiments of the invention and are not intended to be limiting.

Figure 1:
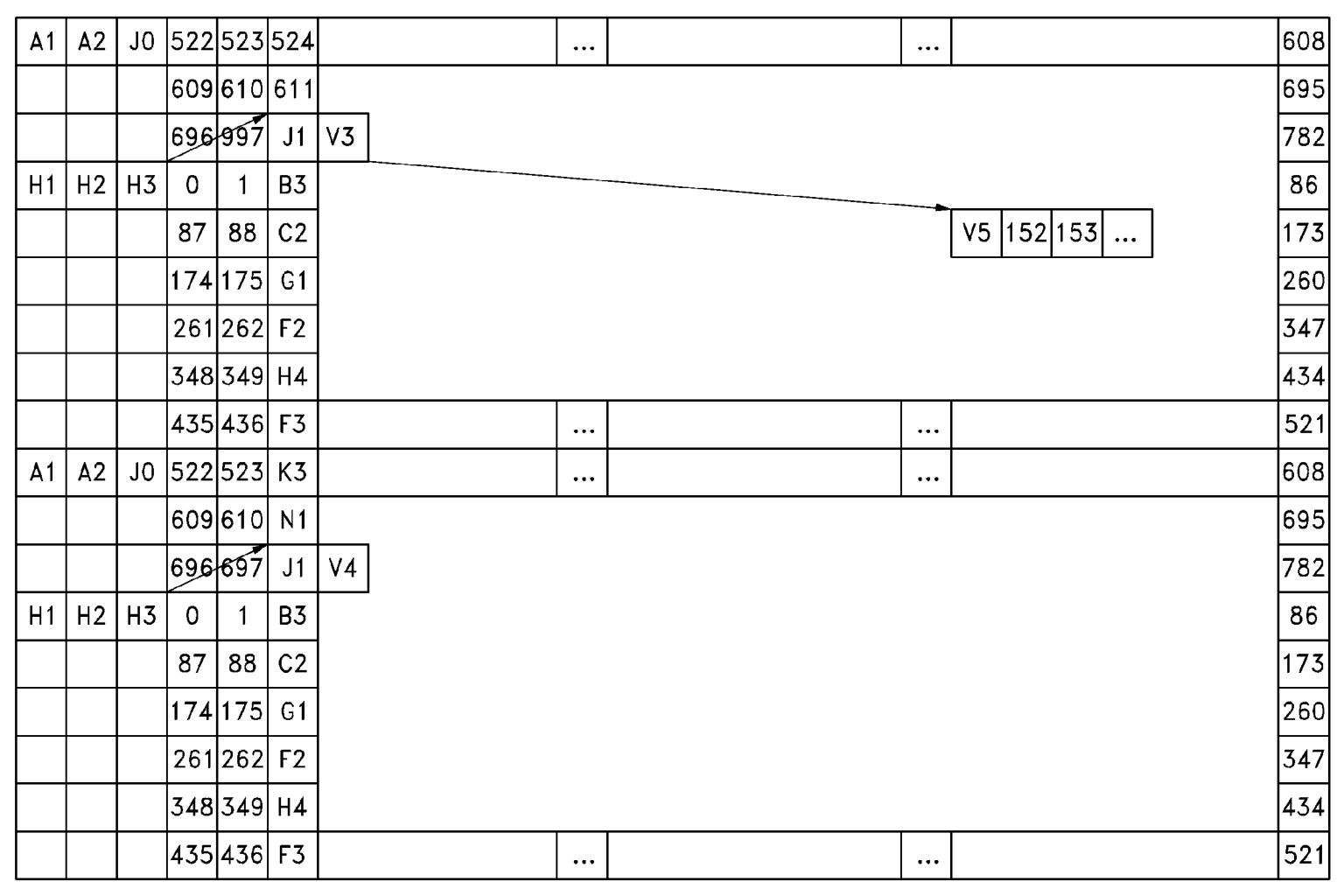

FIG. 1 illustrates an example of a SONET STS-1 transport frame.

DETAILED DESCRIPTION OF THE PREFERRED EMBODIMENT

Although particular embodiments are described herein, other embodiments of the invention, including embodiments that do not provide all of the benefits and features set forth herein, will be apparent to those of ordinary skill in the art.

Figure 4:
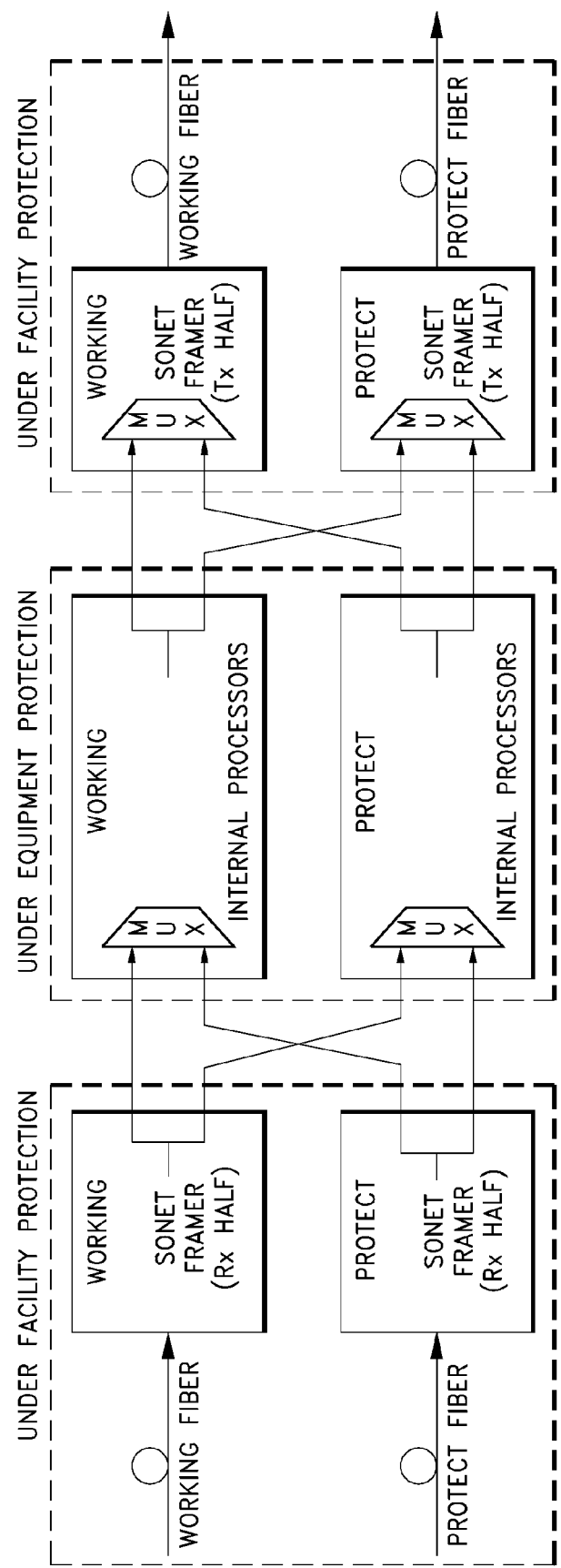
FIG. 4 illustrates a SONET network element (NE).

One embodiment of the invention protects against failures of components within a piece of SONET equipment (labeled "Internal Processors" in FIG. 4). While described in the context of SONET, the principles and advantages described herein are applicable to other systems, such as SDH. Typically, components that are carrying traffic for a large number of clients or are carrying high bandwidth traffic are duplicated. That is, two identical copies of the components are installed, with one copy carrying active traffic and the other resting in standby. The copy carrying traffic is called the working copy and the other is called the protect or standby copy. In the event that one of the copies experiences a failure, the SONET equipment can send and receive data using the other copy. This type of protection is called Equipment Protection.

Facility protection is effective in protecting against failures of the fibers and of the framers. Equipment protection is effective in protecting against failures of the remaining components within the SONET NE.

Figure 2:
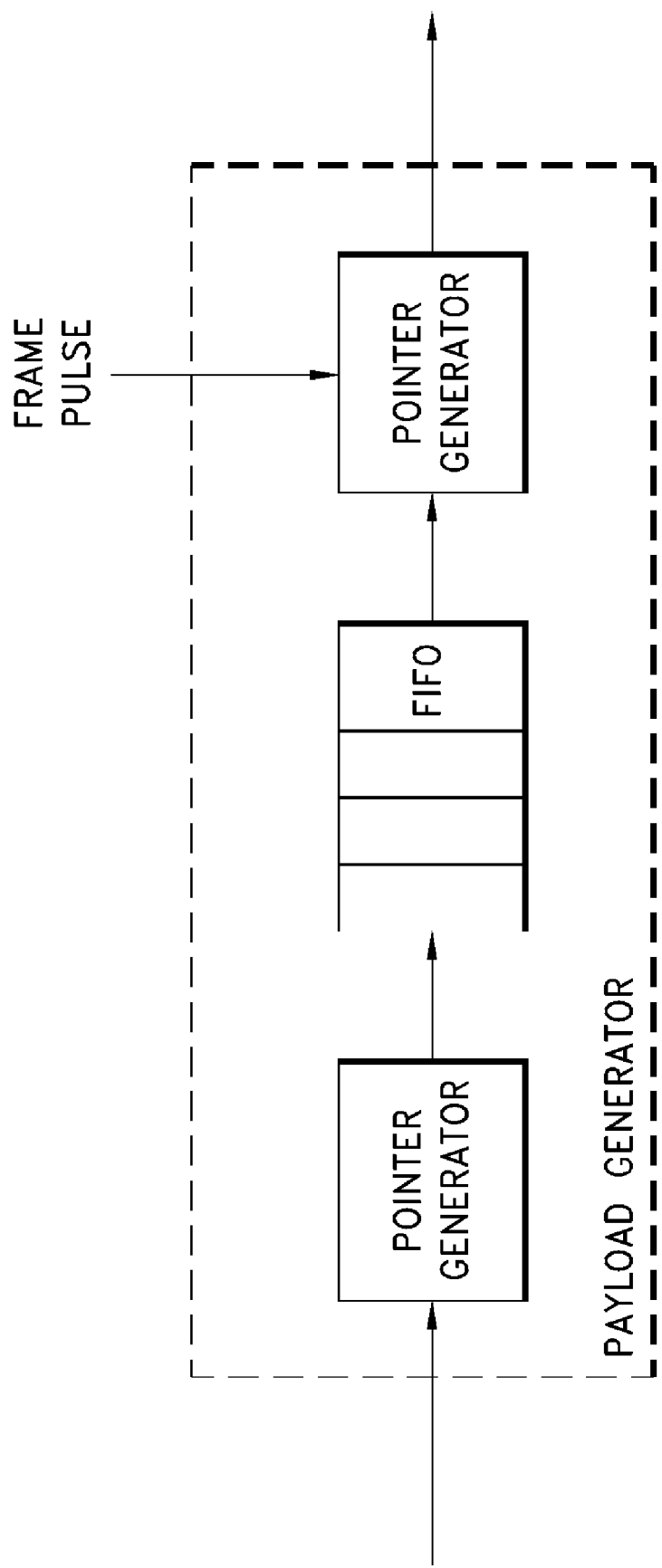
FIG. 2 illustrates an example of an STS payload processor.
Figure 3:
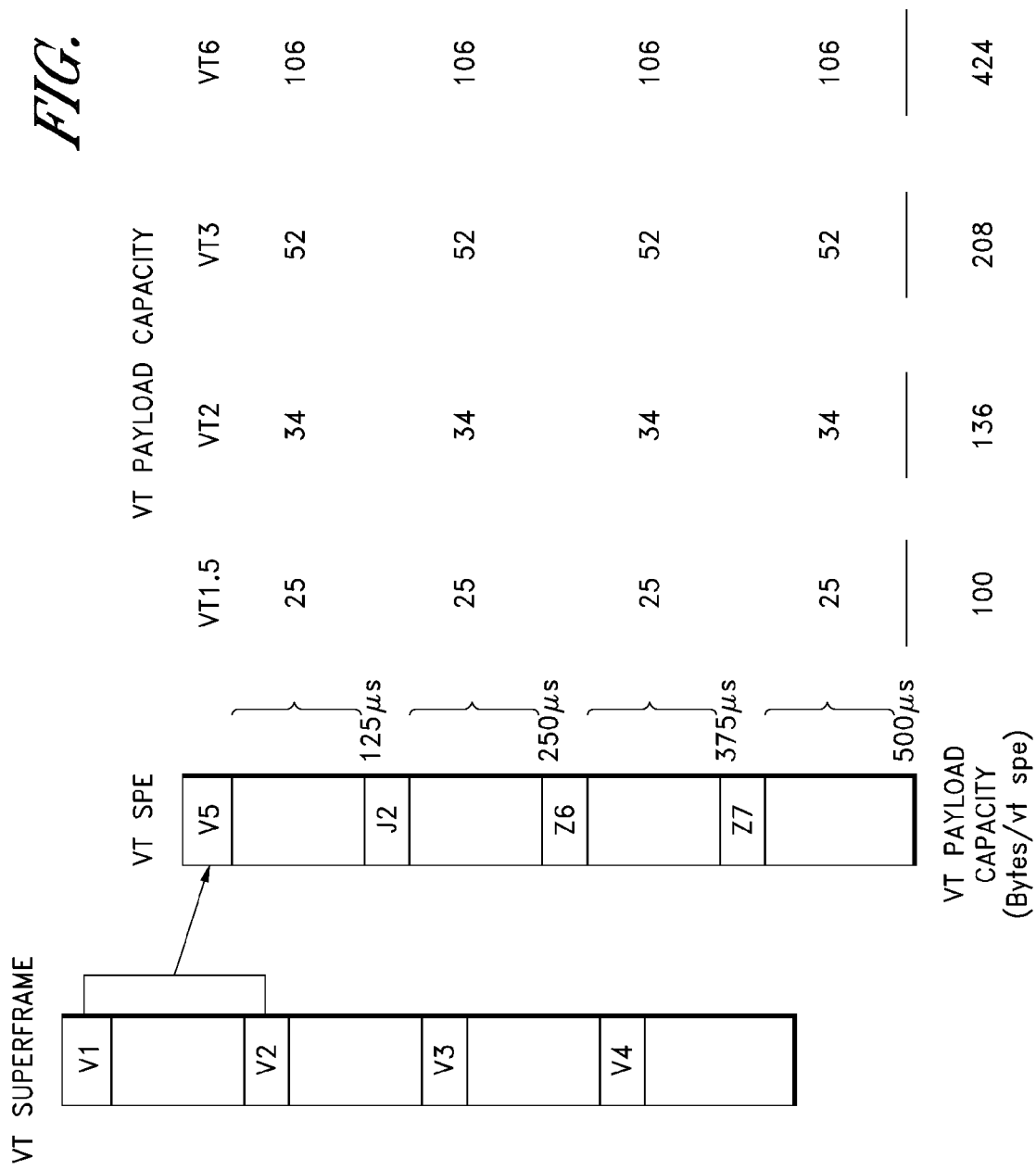
FIG. 3 illustrates an example of a frame format of a virtual tributary.
Figure 5:
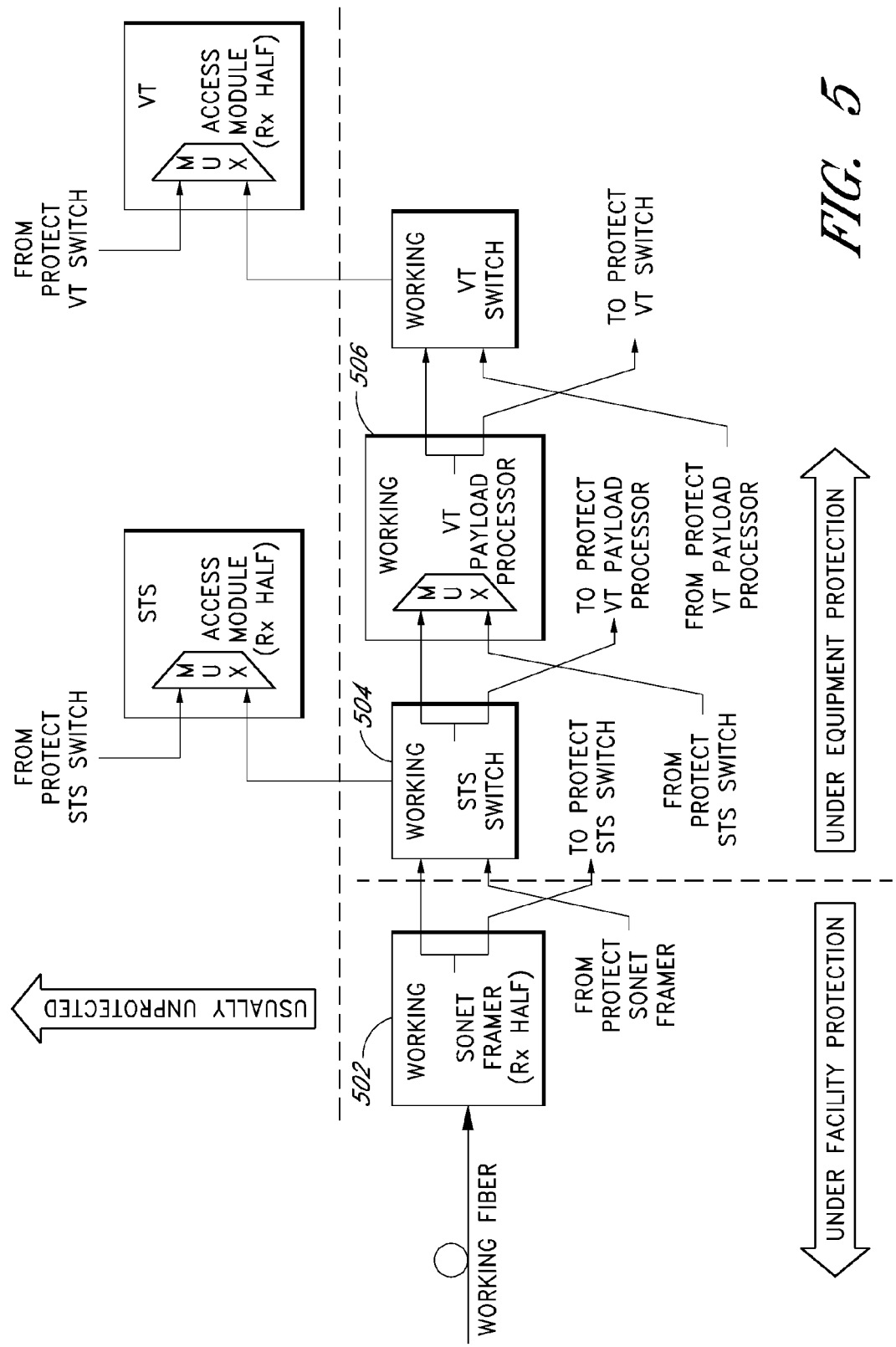
FIG. 5 illustrates a model of the receive side of a typical SONET Multi-Service Provisioning Platform (MSPP).

FIG. 5 illustrates a model of the receive side of a typical SONET Multi-Service Provisioning Platform (MSPP). The MSPP is connected to the telecommunications network over the working fiber and the protect fiber. Each fiber is terminated by a SONET framer. Each framer monitors the status of the incoming fiber and transmits onto the outgoing fiber. The framer also bridges between the timing domain of the fiber to the timing domain of the core of the equipment using pointer justifications, that is, the framer incorporates the payload processor function of FIG. 2.

Typically, each framer multicasts identical copies of the incoming traffic to the working STS Switch fabric and the protect STS Switch fabric. The switch fabric switches STS-1 and STS-Nc streams. Streams that contain a single client, such as DS3, ATM or lower rate STS-N streams are switched directly to STS access modules. A multiplexer in each of these access modules selects between traffic stream from either the working or the protect STS switch. The STS switch switches incoming STS-1 streams that contain Virtual Tributaries (VT) to the working VT Payload Processor and the protect VT Payload Processor. There, the status of each incoming VT stream is monitored and the incoming VTs are aligned to a common STS-1 transport frame and payload frame alignment. The aligned VT streams are multicast to working VT Switch and the protect VT Switch. The VT switch switches the incoming VT streams to VT access modules such as T1/E1 mappers. VT streams can also be groomed into STS-1 streams for re-transmission. A multiplexer at each VT access module selects between traffic from the working or the protect VT switch.

Figure 6:
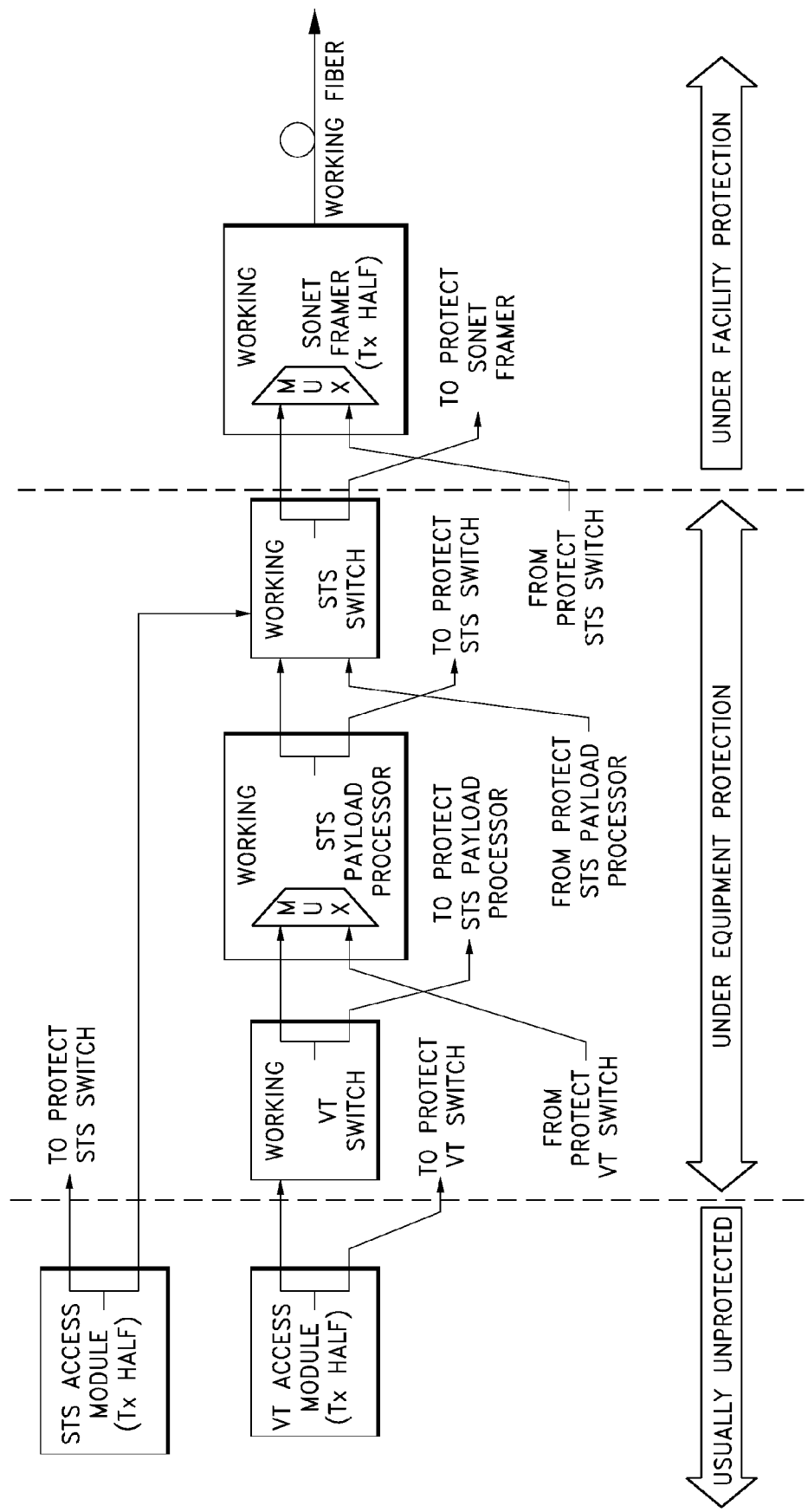
FIG. 6 illustrates the outgoing traffic stream from the access modules to the egress fibers.

FIG. 6 follows the outgoing traffic stream from the access modules to the egress fibers. Virtual Tributary (VT) streams are sourced from, potentially, multiple VT access modules. The VT switch grooms the VT streams into STS-1 streams. In order to allow the STS switch to operate on a single STS transport frame alignment, an STS payload processor aligns the STS-1 streams to a common alignment that is convenient for the STS switch. At each stage, the components multicasts identical data streams to the working component and protect component in the next stage. Components at each stage can select to source data from the working or protect components of the previous stage. Changes to the selection can be made hitless using the mechanisms described previously for the receive side.

In order for the STS switch to be able to select between the working STS payload processor and the protect STS payload processor hitlessly, both payload processors should output an identical data stream. In particular, both STS payload processors should output the same H1, H2 pointer value and issue pointer justifications in the same frame. In the description of the VT payload processor in the receive side, it was disclosed that the same pointer value can be ensured by forcing the pointer generator function in the payload processor (FIG. 2) to use the same single value as the optimum FIFO depth.

At the transmit side of the MSPP, STS streams sourced by the VT switch are not expected to have any STS pointer justifications, and the incoming and outgoing streams of the STS payload processor should be at about the same frequency. For example, they can be at exactly the same frequency. The STS payload processors are not required nor typically expected to generate any pointer justifications. They only need to map from the incoming STS transport frame alignment to the outgoing alignment. Thus, an alternate method is available to the STS payload processor for ensuring the same H1, H2 pointer values. It is feasible to allow a range of FIFO depths to be considered optimum. In the absence of further controls, the working STS stream and the protect STS stream will likely have different H1, H2 pointer values and the two STS payload processors may settle to different FIFO depths. To align the pointers, a device can read the current H1, H2 pointer value generated by each of the STS payload processors and issue positive or negative pointer justification commands to one or both payload processors until the pointers are aligned.

Equipment protection is effective in recovering from failures of the STS-1 switch, the VT Payload Processor and the VT switch. Whenever one of these components fails, traffic can be selected from the other copy, and traffic is typically restored within a few milliseconds. In the absence of failures, it is often useful to select the alternate copy as the active path of traffic. For example, time-space-time switch fabric architectures use timeslots and link assignments within the fabric to be re-arranged when a new client traffic stream is added. In order to prevent traffic disruptions during this re-arrangement, traffic can be sourced from the alternate copy of the switch, temporarily. After re-arrangement is complete, traffic is again sourced from the original copy. Another example of a use to source data from the alternate copy is when the originally active copy has reached its maintenance schedule limits and has to be removed for inspection. It is desirable that no bit errors are introduced when changing selection of one copy or the other as the active path of traffic.

Figure 7:
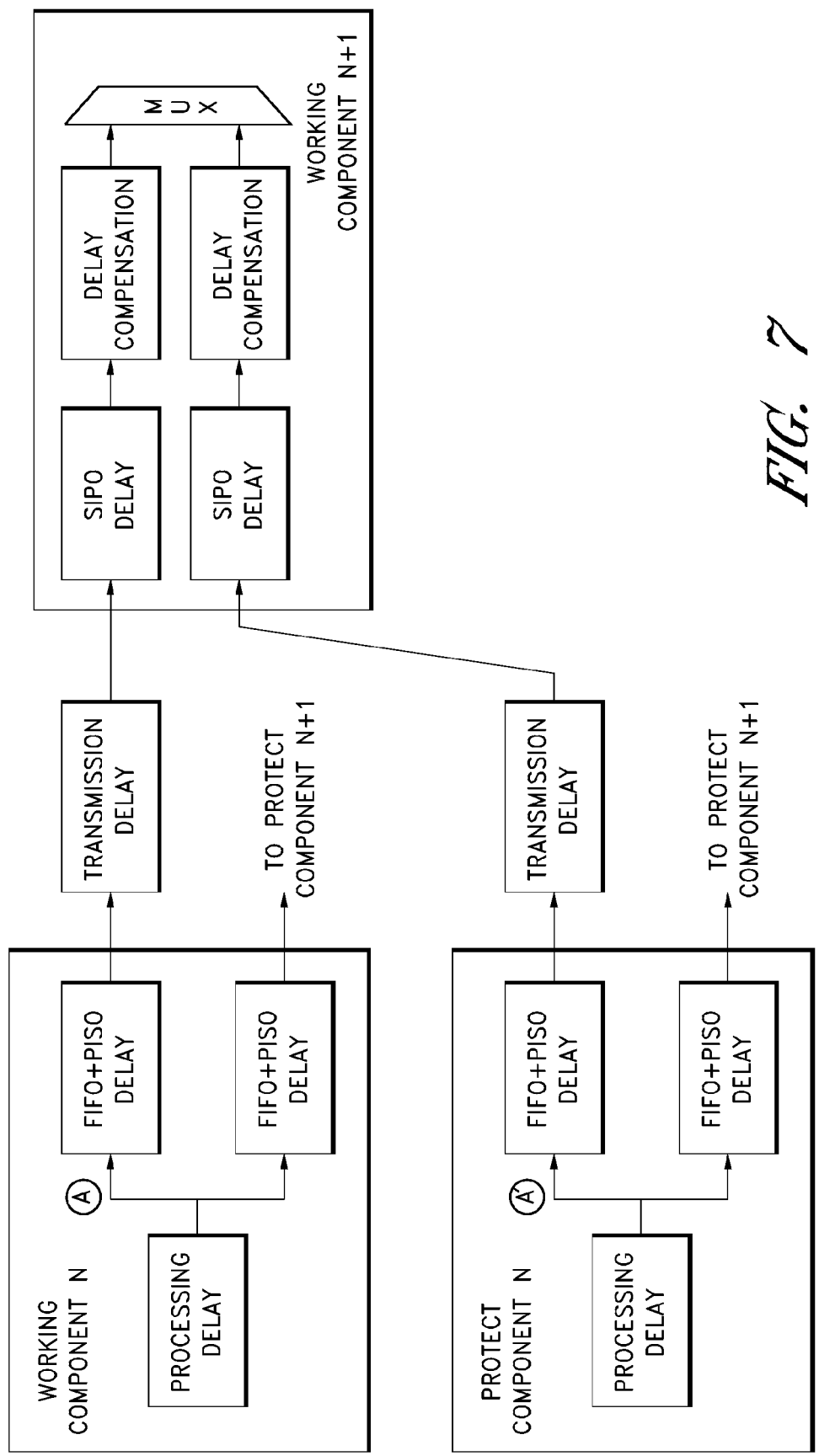
FIG. 7 illustrates the traffic streams between two component blocks within a SONET NE.

FIG. 7 follows the traffic streams between two component blocks within a SONET NE. With current technology, the blocks tend to be connected via high-speed serial links. Consequently, there are parallel-to-serial converters (PISO) and serial-to-parallel converters (SIPO) at the edge of each block. It is also common to have small FIFO buffers connected to these converters to absorb jitter and wander on the links. The printed-circuit board traces between the blocks can be of differing lengths, resulting in differing delays. Since the working copy and the protect copy are independent and are housed in different PC cards, their processing delays can also differ. In addition, it is very difficult to precisely align devices on different PC cards even if a common frame alignment pulse is sent to both copies. These delay variances are represented by variable delay elements in FIG. 7.

In order for Component N+1 in FIG. 7 to be able to arbitrarily select sourcing data from the working or the protect copy of Component N, the data streams on both inputs the multiplexer should be identical and aligned. This disclosure describes how independent working copy and the protect copy of components can be controlled to output identical streams (at A and A' of FIG. 7) and how the delay differences can be compensated at the next component.

Embodiments of the invention allow arbitrary changes of selection between using the working or the protect copy of processing blocks within a piece of SONET equipment without introducing bit errors. The challenges to hitless switchover lie in ensuring that the working copy and the protect copy (A and A' of FIG. 7) are in the same state so that they will output identical data streams, and in compensating for various delay differences such as PC board trace mismatch, device processing delay mismatches and uncertainties in synchronizing independent devices.

One embodiment of the invention is described using the Multi-Service Provisioning Platform shown in FIG. 5 and FIG. 6. Since this embodiment does not address facility protection, for simplicity, the description only covers traffic connected to the working fiber only.

In the ingress direction (FIG. 5), data is delivered on the working fiber to the working SONET framer 502. The SONET framer 502 performs payload processing to adapt the incoming stream to the timing domain and STS transport frame alignment at the core the SONET NE. The aligned stream is multicast via links to the working STS switch 504 and the protect STS switch (not shown). Data at the end of the links at the working STS switch 504 and the protect STS switch should be identical but are not necessarily aligned. The skew between the data can be attributed to the variance in delay between the two parallel-to-serial converters and the difference in lengths of the PC board traces.

To reduce complexity, the core portion of the STS switch typically requires that the ingress streams have the same STS frame alignment. However, the links connected to the switch can have skewed arrival times. At each ingress port of the switch, a simple framing circuit finds STS frame alignment using the A1 and A2 bytes. In one embodiment, the J0 byte of the incoming SONET frame is written to a fixed location in a circular buffer that is also acting as an ingress FIFO. The J0 byte corresponds to a section trace byte in the SONET section overhead. Any identifiable byte within a SONET transport frame can be used. The size of the buffer, in bytes, should be an integer factor of the number of bytes in the STS transport frame. That is, the number of bytes in the STS-N frame (810*N bytes) should be evenly divisible by the size of the buffer, in bytes. The STS transport frame of the ingress ports can be aligned at the switch core by reading the fixed location containing the J0 byte from the circular buffers simultaneously.

The working copy and the protect copy of the STS switch should be synchronized. However, precise synchrony is typically not necessary. Mismatches can be compensated for by downstream devices. Typically, a system frame pulse is sent to both STS switches. Thereafter, a software configurable register controls the offset from the frame pulse to the point in time when the J0 location in the circular buffer is read. Alternatively, in the absences of an external frame pulse, it is possible to monitor the arrival times of the J0 byte on the ingress links and set the read time of the J0 bytes to an appropriate time after they have arrived.

The STS switch directs STS-1 streams that are carrying virtual tributaries to the working Virtual Tributary (VT) Payload Processor 506 and to the protect Virtual Tributary (VT) Payload Processor (not shown). Further details of one embodiment of a Virtual Tributary Payload Processor 802 will be described later in connection with FIG. 8. Each Virtual Tributary Payload Processor has connections to both the working STS switch and the protect STS switch. Using the same simple framing logic and the circular buffer 816 as in the STS switch, a Virtual Tributary Payload Processor 802 (FIG. 8) (working or protect) can compensate for the skew between data arriving from the two STS switches and hitlessly select between them.

The main function of the Virtual Tributary Payload Processor 802 (FIG. 8) is to perform payload processing on the incoming virtual tributaries. In many cases, the incoming tributaries are carried in multiple STS-1 streams. These STS-1 streams are arbitrarily aligned and may experience STS pointer justifications and VT pointer justifications. In order to combine virtual tributaries from unaligned STS-1s into a common set of STS-1 streams at the VT switch fabric downstream, the Virtual Tributary Payload Processor aligns the virtual tributaries to a common fixed STS-1 transport and payload frame alignment and a common tributary multi-frame alignment. Incoming STS-1 pointer justifications are translated to outgoing tributary pointer justifications based on their effects on individual VT FIFO buffers.

Figure 8:
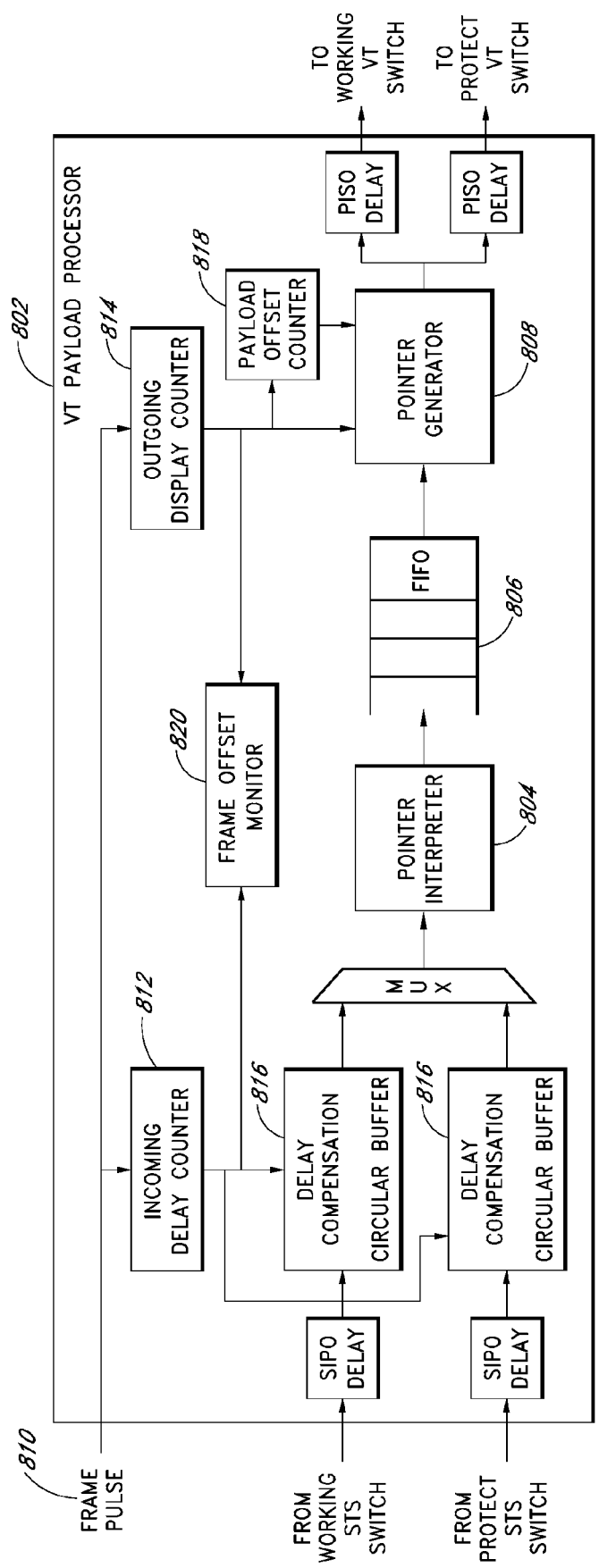
FIG. 8 illustrates an embodiment of a Virtual Tributary Payload Processor.

The Virtual Tributary Payload Processor 802 is functionally a payload processor, as shown in FIG. 8. It includes a pointer interpreter block 804 to monitor incoming V1, V2 bytes to identify the VT payload frame boundary (the location of the V5 VT path overhead byte) and to detect for pointer justifications, a FIFO buffer 806 to store VT SPE bytes, and a pointer generator 808 to set outgoing V1, V2 bytes to point to the V5 byte. The pointer generator 808 also monitors the depth of the FIFO buffer in order to insert outgoing pointer justifications to keep the FIFO buffer at an optimum depth. Note that the transit time of any one byte of an incoming VT payload through the Virtual Tributary Payload Processor 802 is longer when the FIFO buffer 806 is deeper than when the buffer is shallower. Thus, for a given triplet of outgoing STS transport frame, payload frame alignments, and tributary multi-frame alignment, the outgoing VT pointer is larger when the FIFO buffer 806 is deeper than when it is shallower.

Note that there are two copies of the Virtual Tributary Payload Processor 802 in the system of FIG. 5; a working copy 506 and a protect copy (not shown). For hitless switchover at downstream points, both copies of the Virtual Tributary Payload Processor 802 should output identical streams. This indicates that at the outgoing stream, the following rules should apply: (Rule 1) The STS transport frame alignment in both the working device and the protect device should be aligned to be within the skew tolerance of the downstream devices (that is, the size of the skew tolerance typically depends on the depth of a circular buffer 816 used); (Rule 2) The STS payload frame in both the working device and the protect device should have the same offset relative to the STS transport frame to ensure that the H1, H2 bytes are identical; (Rule 3) The virtual tributary pointer generator 808 in both the working device and the protect device should sample the state of the device (e.g., tributary FIFO buffer depth) at the same point relative to the incoming traffic stream and the outgoing traffic stream; (Rule 4) The pointer generator 808 in both the working device and protect device should make identical, deterministic pointer justification decisions when presented with the same device state. Pseudo-random algorithms, such as sigma-delta, would violate this rule unless the pseudo-random number generators in the two devices are synchronized; and (Rule 5) If the virtual tributary pointer generator 808 uses FIFO buffer depth as the metric to effect pointer justifications, there should be a maximum of only a single FIFO depth where the pointer generator will not issue a positive or negative pointer justification. Having a greater number of quiescent FIFO depths would allow the working device and protect device to maintain different FIFO depths and thus output different V1, V2 pointer values.

Rule 3 above requires that the pointer generator 808 samples the state of the device after each device has received up to the same byte of the incoming data stream and has read out the same number of bytes from each tributary FIFOs. A useful analogy to understanding rule 3 is to consider polling the reaction of the audience in neighboring theatres that are showing the same film. To get a meaningful comparison of the reactions, one should poll both audiences after the same scene of the movie (e.g., after a gun has been fired) and not at 9:30 pm precisely. Polling at the same wall-clock time does not guarantee the same reaction if the movies did not start at the precisely the same time in both theatres, or if the two projectionists have unsynchronized watches and stopped the movie at slightly different scenes. One projectionist may have stopped the movie just before the gun was fired and the other just after. Reaction of the two audiences could differ greatly.

To illustrate the five rules, consider the model of a Virtual Tributary Payload Processor 802 shown in FIG. 8. A frame pulse 810 is connected to a software configurable incoming delay counter 812 and an outgoing delay counter 814. The incoming delay counter 812 determines when, relative to the frame pulse 810, to read the special location in the circular buffer 816 to retrieve the J0 byte of both the working incoming traffic stream and the protect incoming traffic stream. The outgoing delay counter 814 determines when, relative to the frame pulse 810, to locate the STS transport frame (J0 byte), in the outgoing traffic stream. The offset of the STS payload frame (J1 byte) from the STS transport frame and the phase of the tributary multi-frame (H4 byte) are controlled by the software configurable payload offset register 818.

The incoming delay counter 812 in the working copy and the protect copy of the Virtual Tributary Payload Processor 802 can be set independently. They should be set to ensure that the circular buffer 816 is at an optimum range of depth to account for the time of arrival of data streams from the STS switches; this is possible as long as rule 1 is meet by the upstream STS switches and interconnect up to the Virtual Tributary circular buffers 816. It is typically not necessary for the incoming delay counters 812 in the two Virtual Tributary Payload Processors to be set to the same value. However, as required by rule 2, the payload offset and the tributary multi-frame phase in both copies of the Virtual Tributary Payload Processor should be set to the same value.

In this model of the Virtual Tributary Payload Processor 802, the pointer generator function 808 measures the depth of the tributary FIFO buffers 806 at a fixed point in the outgoing stream. A convenient measurement point is the V4 byte of each tributary. Other measurement points may be used. The pointer generator 808 selects an optimum depth for the FIFO buffer 806 and uses pointer justifications to drive the FIFO buffer 806 towards that depth. If the depth is deeper than the optimum, the pointer generator 808 will schedule a negative pointer justification event. If the depth is shallower than the optimum, a positive pointer justification is scheduled. No pointer justifications are scheduled if the FIFO buffer 806 is at the optimum depth. In order for the working Virtual Tributary Payload Processor and protect Virtual Tributary Payload Processor to autonomously reach the same FIFO buffer depth without coordination, the optimum depth should only be a single value, as pointed out by rule 5. It should not permissible for more than one depth value, for example, 4 bytes and 5 bytes, to be both considered as optimum.

The transport frame offset monitor 820 monitors the offset from when the J0 byte is read from the circular buffer 816 to the J0 byte position being formed in the outgoing traffic stream. The outgoing delay counter 814 in the working copy and the protect copy of the Virtual Tributary Payload Processor 802 should be set such that the transport frame offset monitor register 820 in both copies reports an identical value. Under this condition, following the rule 3 requirement, the pointer generators 808 will be measuring FIFO buffer depths after the respective Virtual Tributary Payload Processor 802 has processed the same number of bytes after J0 of the incoming traffic stream. Because the measurement point is fixed at the V4 byte, both pointer generators 808 will be taking measurements after it has read out the same number of bytes onto the outgoing traffic stream. Thus, both the working device and protect device are taking measurements of an identical device state and have the same criteria for scheduling pointer justifications (one optimum FIFO buffer depth), the outgoing data stream from both Virtual Tributary Payload Processors 802 can be made to be identical automatically, without close coordination.

Embodiments of the invention are applicable to any digital data streams with a periodic frame structure. By analyzing the frame boundaries, two identical data streams can be aligned using the circular buffer 816 described. SONET/SDH streams are byte oriented and the size of the circular buffer 816 is best measured in bytes. In some cases, the size of the data stream frames are bit oriented. Examples are, T1, T3, E1, E2, E3 and E4 streams. For those streams, the size of the circular buffer 816 is typically best measured in bits and should evenly divide into the size of the frame, in bits.

In order to generate identical streams from separate copies of apparatus, it is typically necessary to coordinate the actions in the copies. One embodiment of the invention describes using identifiable points in the SONET data streams to anchor the time instant to measure FIFO depth and make pointer justifications. The concept to anchoring measurement time and scheduling action based on known points in the data stream is applicable to other data streams that have periodic frame structures. For example, separate T1 circuit boards can be able to inject ESF data link messages into two identical T1 streams and maintain them as identical, post injection, by ensuring that the message will only begin at the first frame of an ESF multi-frame.

Another Embodiment

Figure 9:
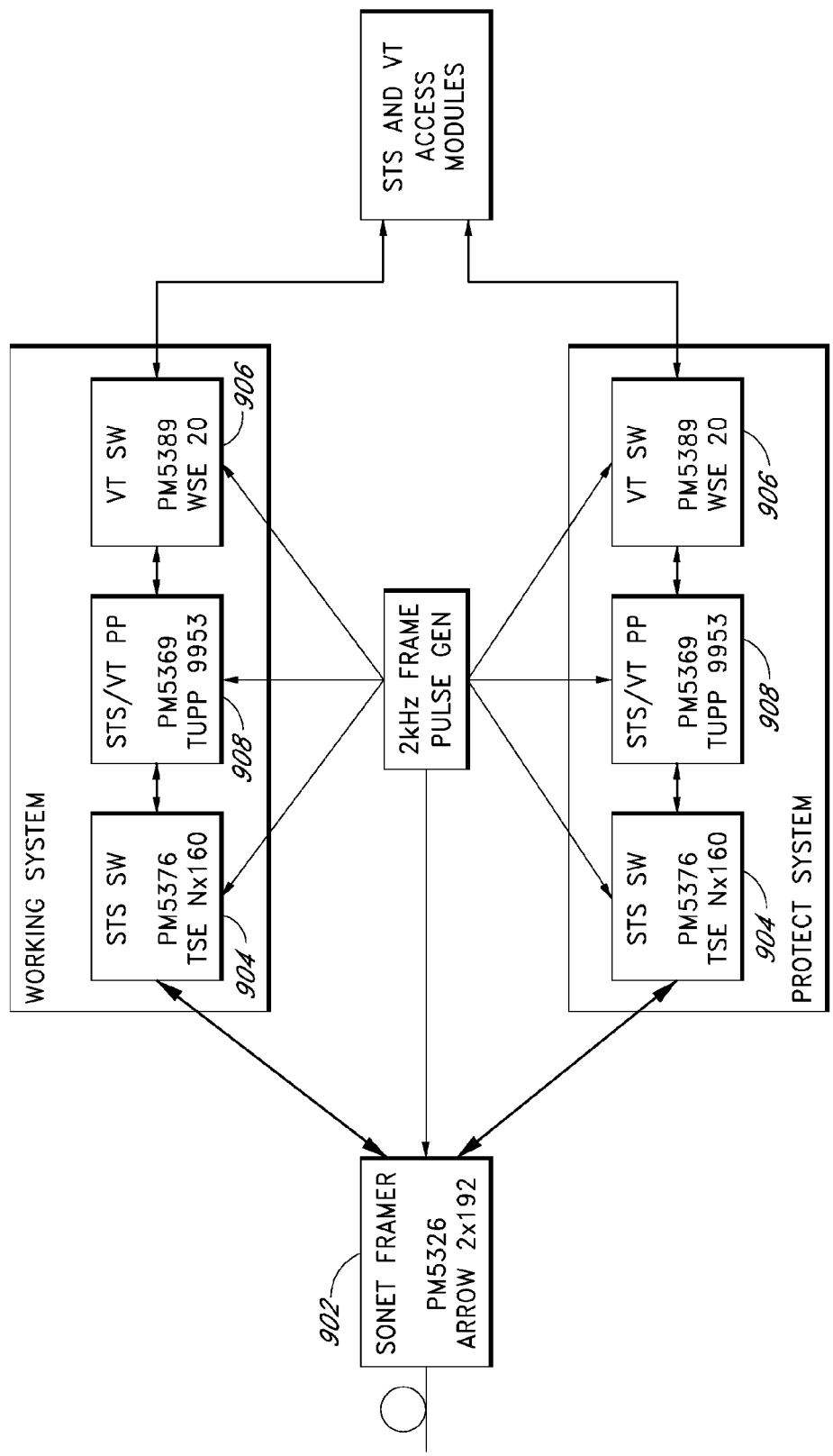
FIG. 9 illustrates an embodiment of a network element and distribution of timing reference.

Another embodiment of the invention exists in a system is depicted in FIG. 9. The system will be described in the context of SONET, but the principles and advantages are applicable to other systems, such as SDH. The system includes a SONET framer 902, e.g., a PMC-Sierra ARROW2X192 (PM5326); an STS switch 904, e.g., a PMC-Sierra TSE Nx160 (PM5376); a VT switch 906, e.g., a PMC-Sierra WSE-20 (PM5389); and a STS Payload Processor (on the transmit side) 908 or a VT Payload Processor (on the receive side) 908, e.g., a PMC-Sierra TUPP 9953 (PM5369).

Hitless switch-over between the working system and the protect system is supported in both the STS and VT access modules for the ingress path (Arrow2x192 through to the STS and VT access modules) and the ARROW 2x192 for the egress path (STS and VT access modules through to the Arrow2x192).

Description of the TUPP 9953 Virtual Tributary Processor

The PM5369 TUPP 9953 SONET/SDH Tributary Unit Payload Processor for 9953.28 Mbps or 2488.32 Mbps interfaces is a monolithic integrated circuit that implements a configurable, multi-channel, payload processor that aligns and monitors performance of SONET virtual tributaries (VTs) or SDH tributary units (TUs).

The TUPP 9953 integrates high-order/STS path level termination processors and Low-Order (VT/TU) Payload and Pointer Processors. The TUPP 9953 processes the tributaries in the 192 STS-1 synchronous payload envelopes of an STS-192 byte serial stream.

On the RX to Drop side, the TUPP 9953 remaps the incoming transport frame, payload frame and tributary multi-frame alignment on the Receive line side to the user defined alignments on the DROP interface via low order pointer processing. Pointer justifications in the high-order payload are translated to low-order pointer justifications. Consequently, the VT/TUs are located at fixed columns of the transport frame.

Figure 10:
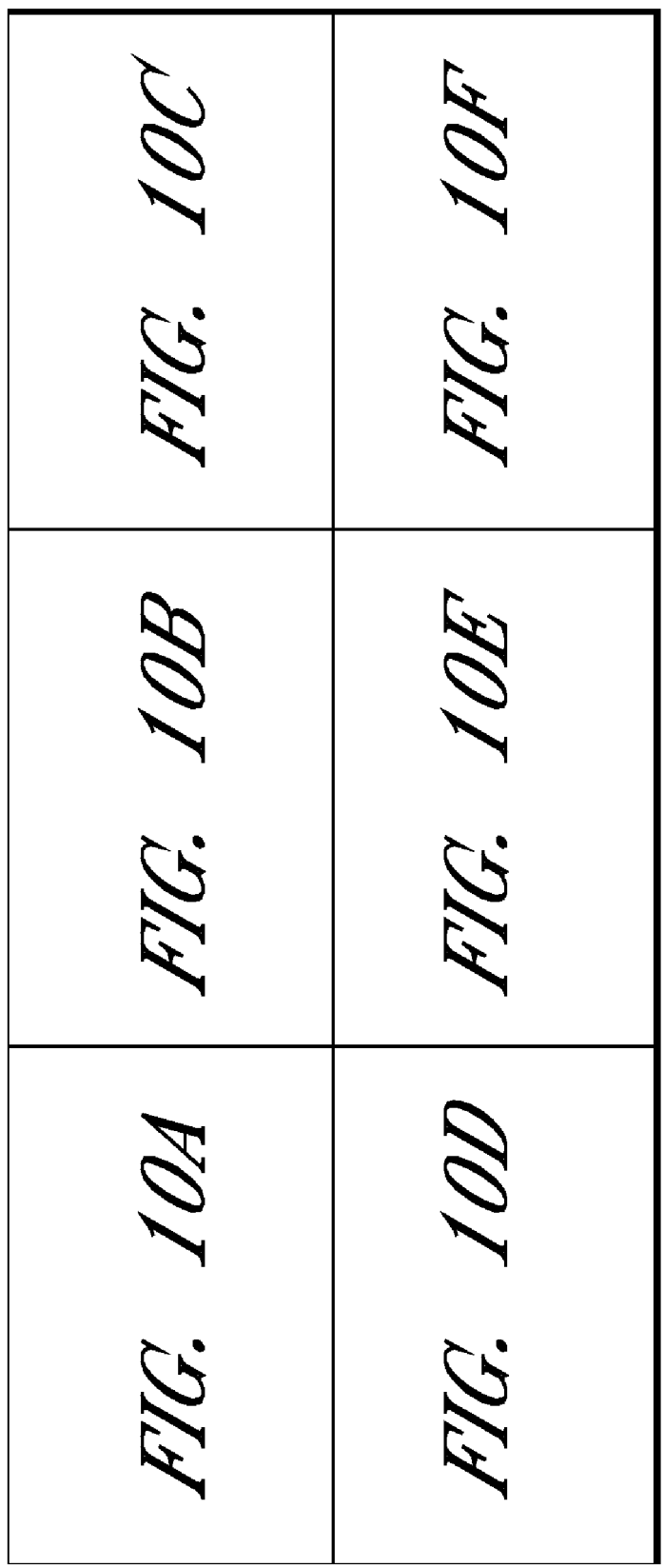
FIG. 10 illustrates further details of a Virtual Tributary Payload Processor.
Figure 10A:
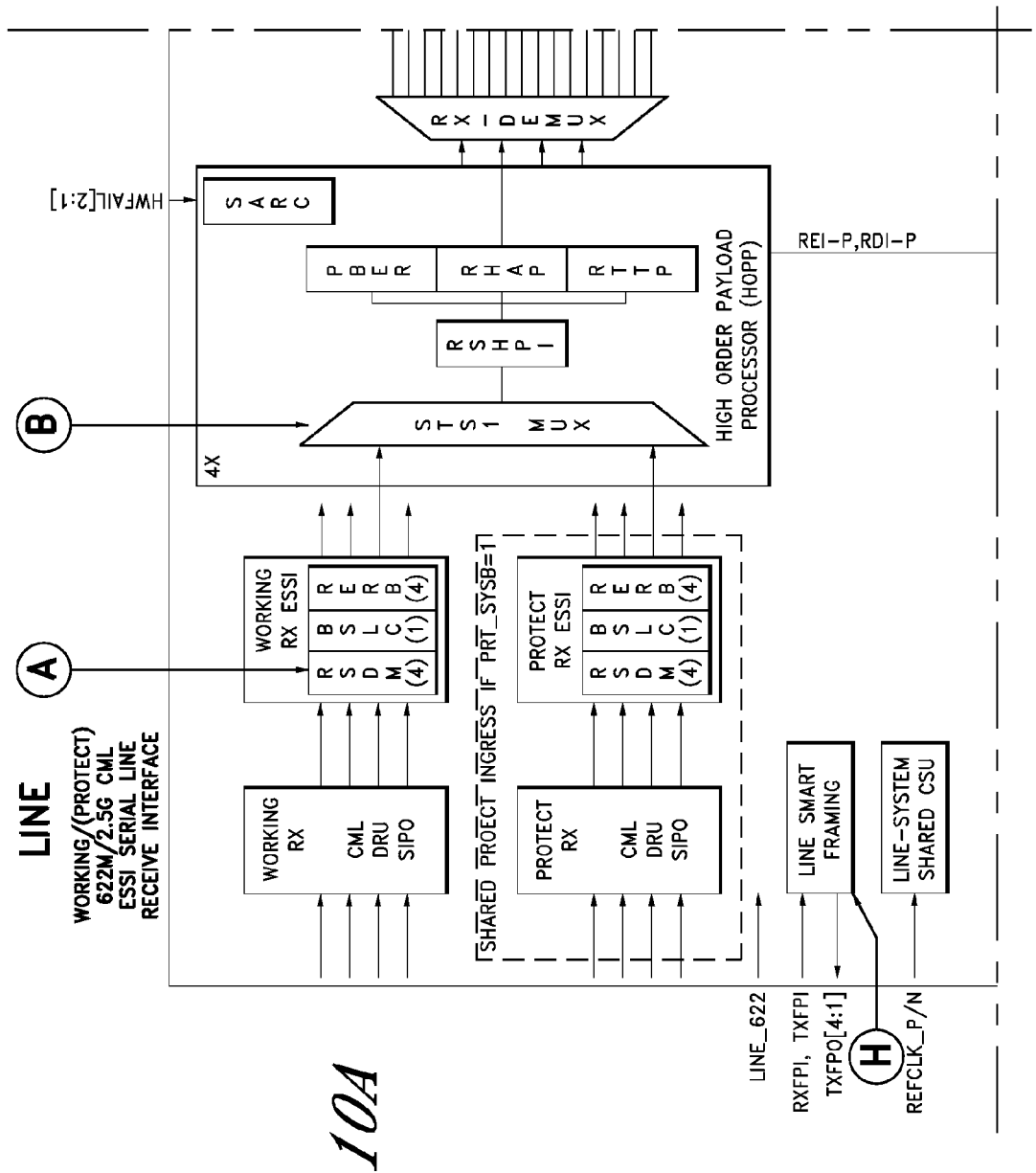
Figure 10B:
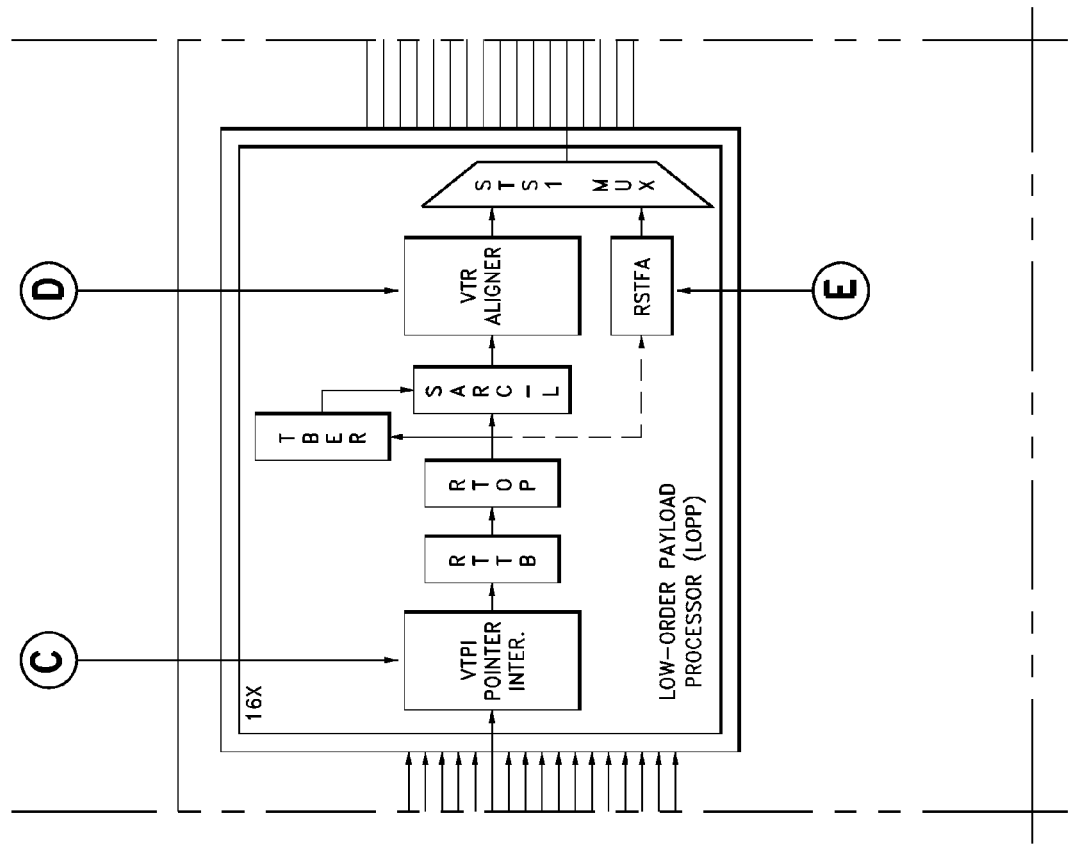
Figure 10C:
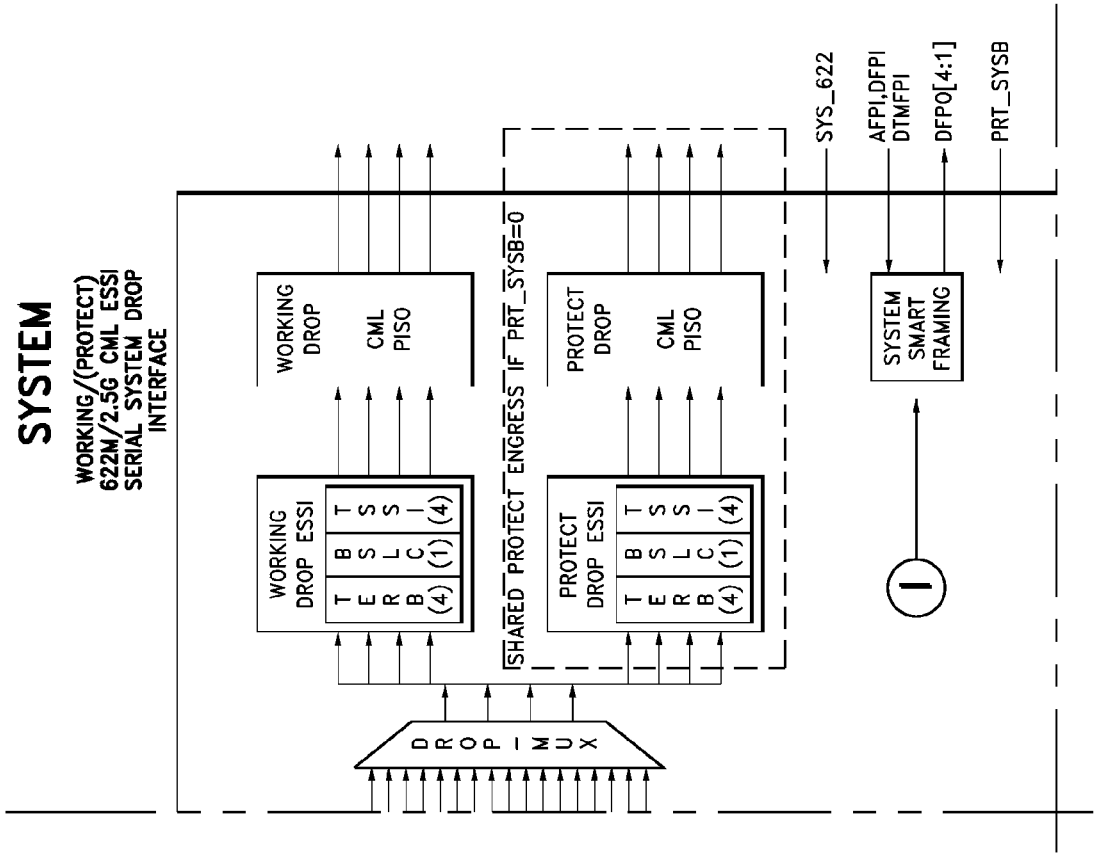
Figure 10D:
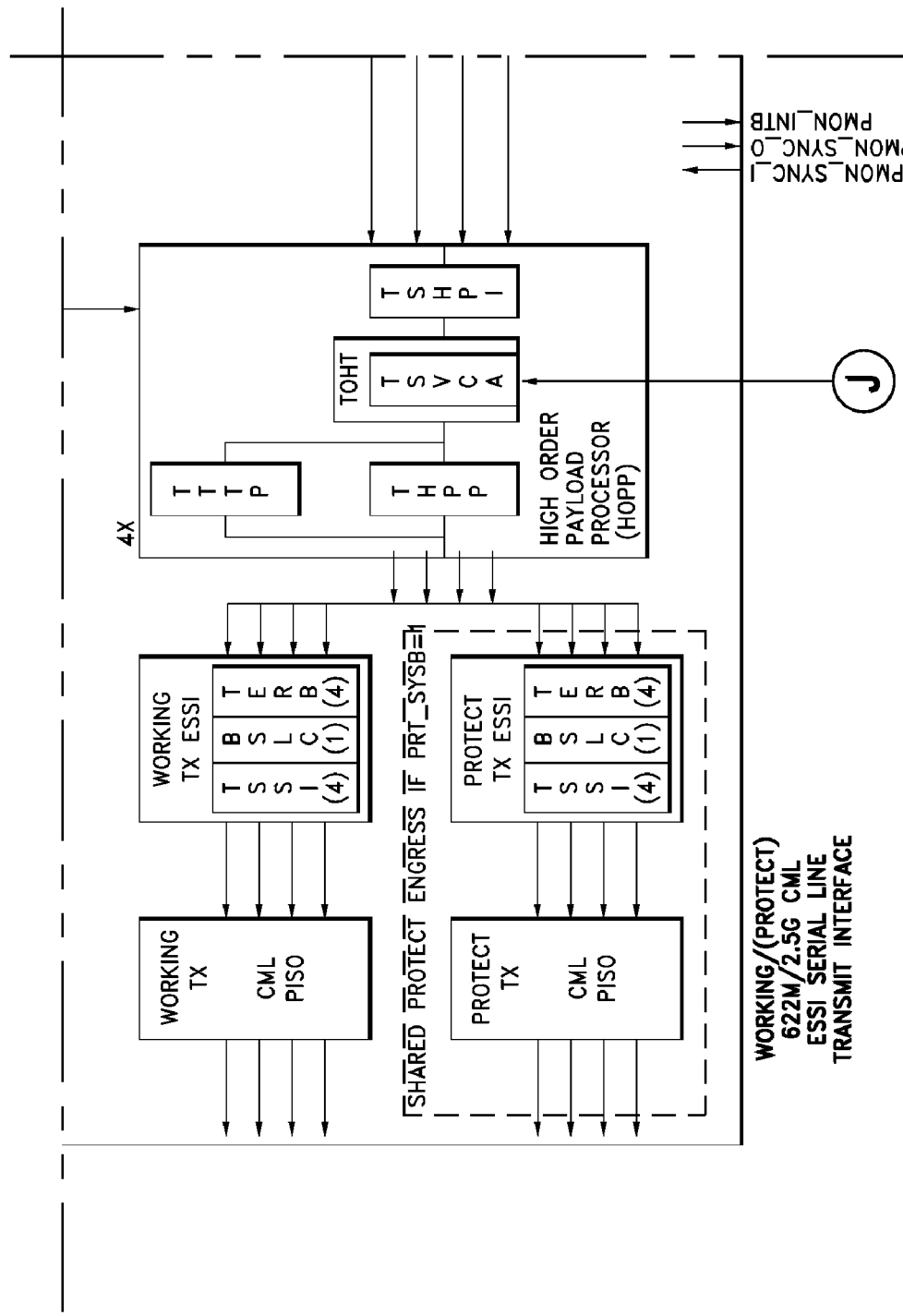
Figure 10E:
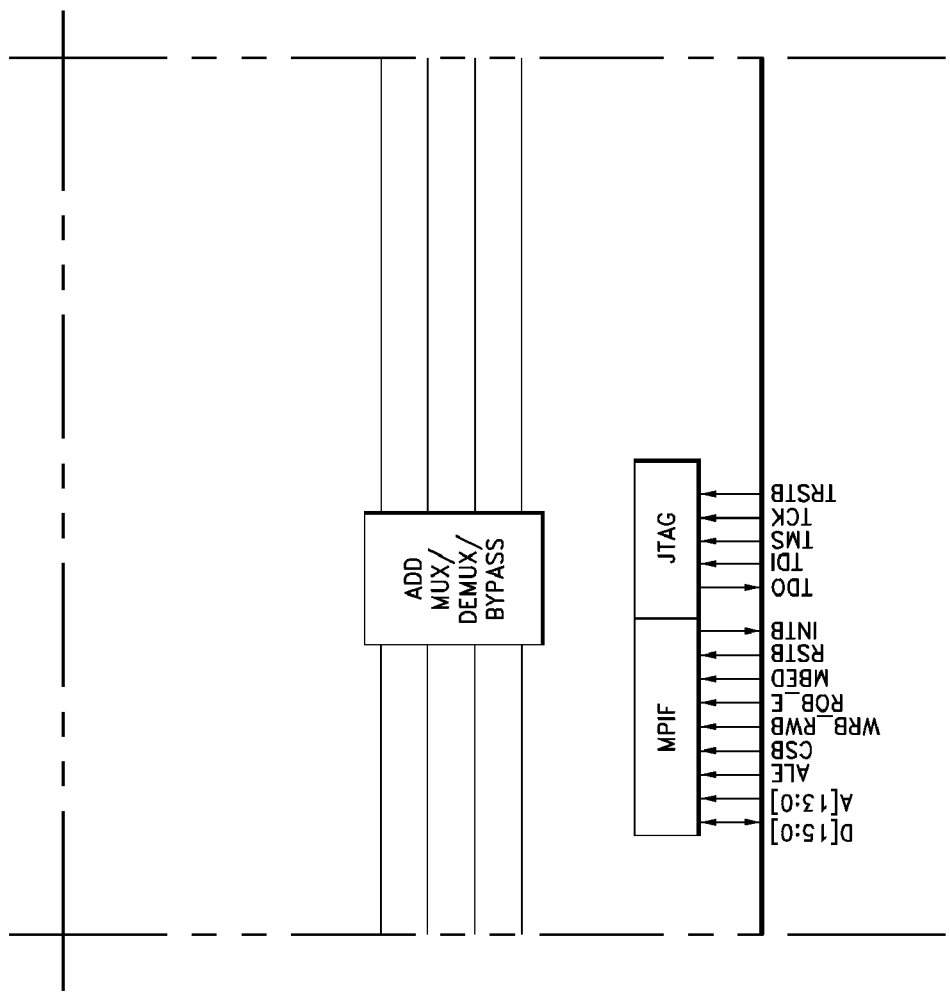
Figure 10F:
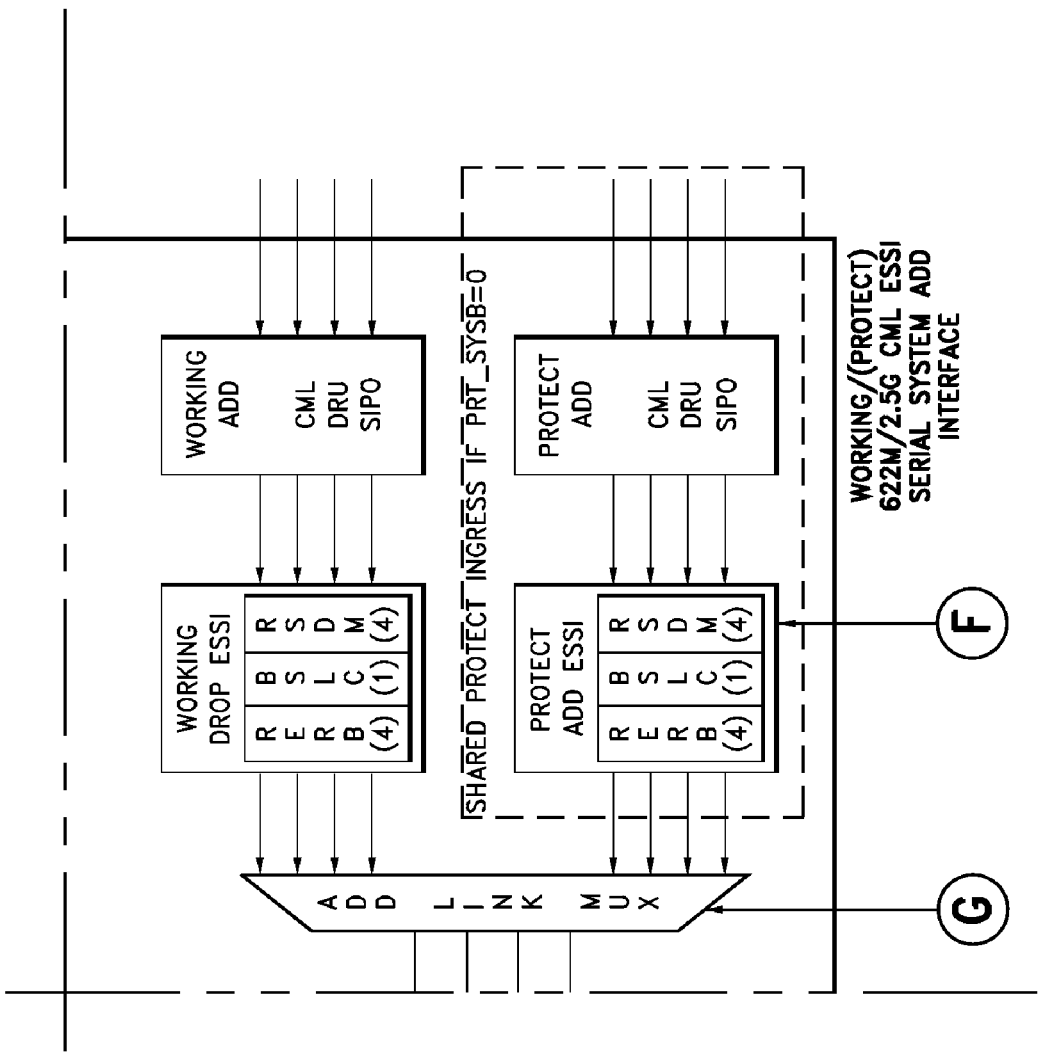

In FIG. 10, the blocks that are relevant to the illustrated embodiment of the invention are labeled A to J, these blocks perform the functions of the Virtual Tributary Payload Processor model shown in FIG. 8, in the following way: Blocks A (RSDM) and F (RSDM) perform the function of the Delay Compensation Circular Buffer; Blocks B (STS-1 Mux) and G (ADD Link Mux) perform the function of the working-protect select multiplexer; Block C (VTPI) performs the function of the pointer interpreter; Block D (VTPA) performs the functions of both the FIFO and the pointer Generator; Block E (RSTFA) performs the function of the Frame Offset Monitor; Block H (LINE SMART FRAMING) performs the function of the incoming Delay counter; Block I (SYSTEM SMART FRAMING) performs the function of the outgoing delay counter; Block J is not modeled in FIG. 8; Block J performs the function of FIFO and pointer generator of the STS payload processor shown in the Model of the transmit side of a SONET MSPP depicted in FIG. 6.

In one embodiment (see FIG. 10), the offset of the transport frames between the ingress and egress side of the VTPA is fixed using the delay values and measured using the RSTFA offset register. The VTPA includes the FIFO and the Pointer Generator of FIG. 2. On the egress side of the VTPA, the sampling point (i.e., the fixed point in time where the state of the devices is the same) is identified. The sampling point at frame counter value at the egress side of the FIFO determines the LO pointer value. Marking the sampling point (V5 byte of the incoming frame) is done by carrying an extra bit through the FIFO.

Figure 11A:
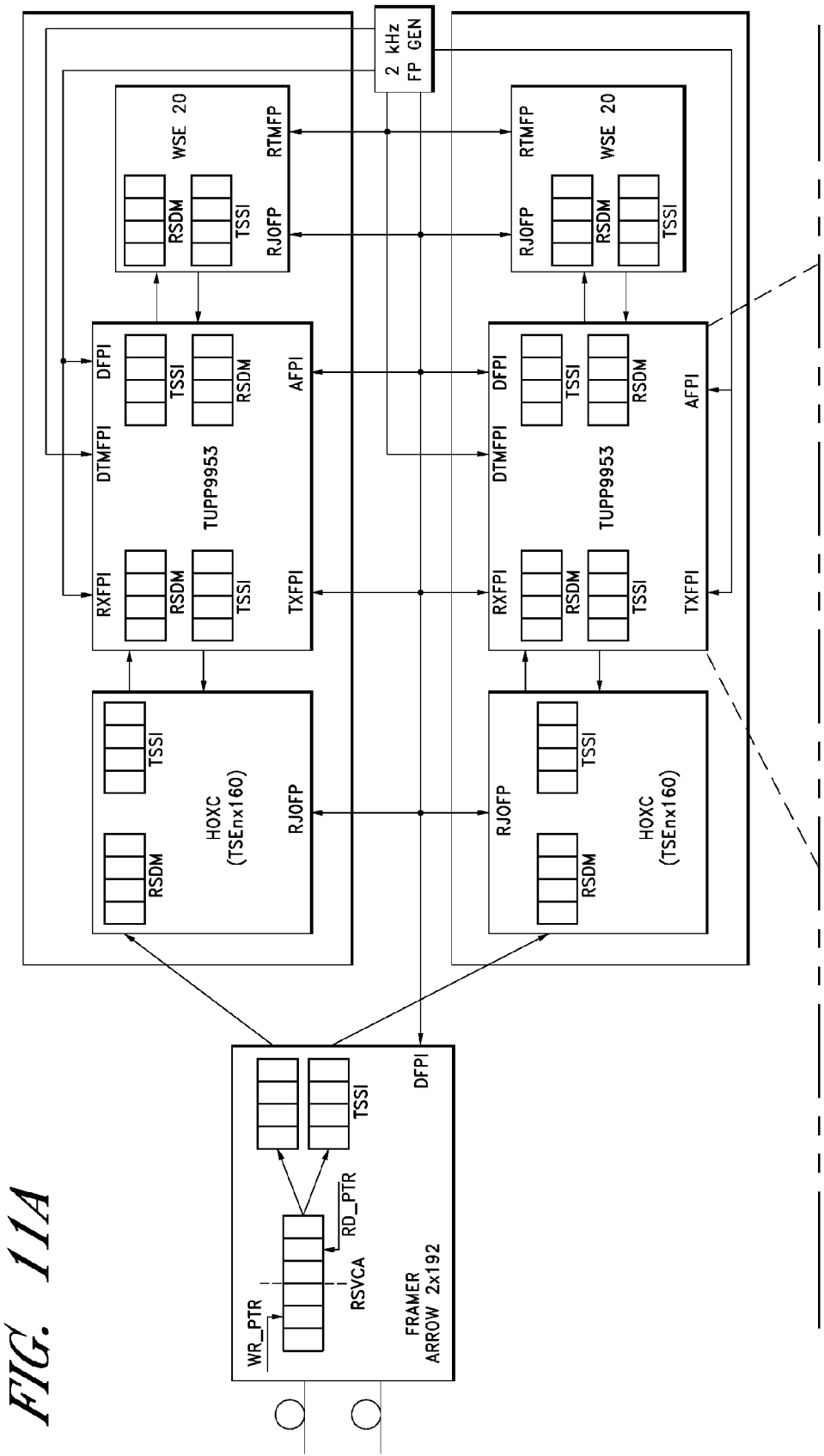
FIG. 11 is a visual representation of the FIFO blocks throughout the datapath.
Figure 11B:
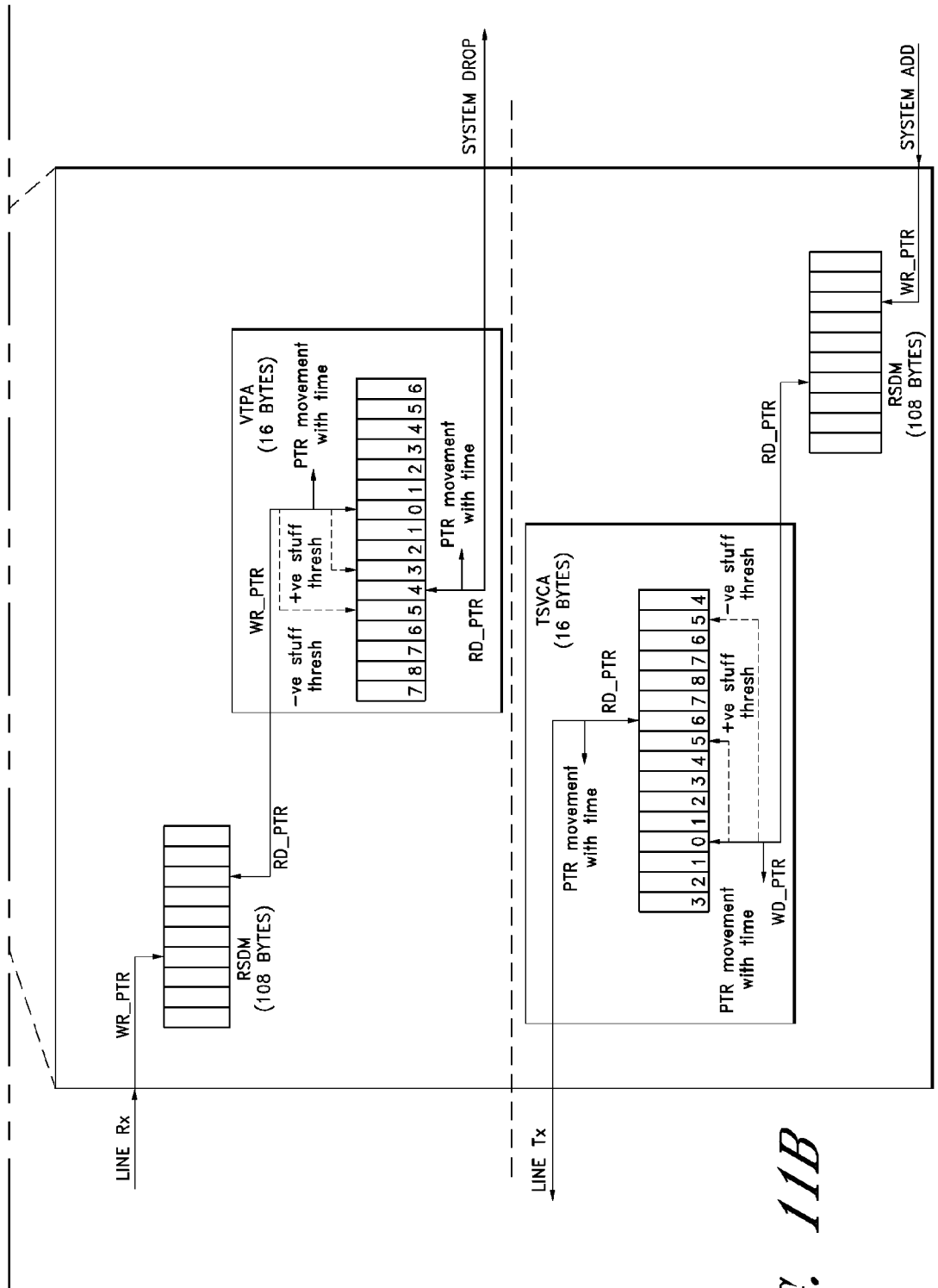

FIG. 11 is a visual representation of the FIFO blocks throughout the datapath. One particular embodiment of the SONET Framer 902 will now be described. The SONET Framer 902 (e.g., ARROW 2x192) typically has a maximum skew of 20 ns (6 bytes) between its serial high-speed output ports. The STS switches 904 (e.g., TSEnx160 devices) wait until the J0 position is in its RSDM FIFOs. Assuming that the RJ0FP frame pulse and REFCLK distribution is synchronous across the active and standby STS switches 904 (e.g., TSEnx160 devices), the RSDM FIFO removes the skew between the ARROW 2x192 devices and the output ports within each device. The STS switch 904 (e.g., TSEnx160) has a 2 byte transmitter skew at the output interfaced to the STS/VT Payload Processor 908 (e.g., TUPP 9953 device). Similar to the STS switch 904 (e.g., TSEnx160), STS/VT Payload Processor 908 (e.g., TUPP 9953) and VT Switches 906 (e.g., WSE20 RSDM FIFOs) are programmed such that they remove the transmitter skew coming from the STS switch 904 (e.g., TSEnx160) and STS/VT Payload Processor 908 (e.g., TUPP 9953), respectively. The RSDM FIFOs satisfy Rule 1: skew between the working data stream and protect data streams is within the skew tolerance of downstream devices in which hitless switchover is performed. In this particular implementation, the maximum skew tolerance is 102 bytes, dictated by the depth of the RSDM circular buffer of 108 bytes, minus allowance of 6 bytes to avoid circular buffer read/write pointer collisions.

In both working stream and protect stream, the high order pointer values is constantly shifting as there is rate adaptation at the RSVCA block in the ARROW 2x192. The RSVCA block implements an STS Payload Processor (See FIG. 2) including the FIFO to bridge between the line-side timing domain and the system-side timing domain. Both working and protect TUPPs see the same pointer values and pointer adjustments as there is a single common source (RSVCA). Hence both working and protect STS/VT payload processors (e.g., TUPP 9953 VTPIs) receive identical streams with a small skew, that is within the allowed tolerance.

The VTPA FIFO size is 16 bytes. The VTPA takes the incoming frame alignment (based on RXFPI frame pulse and the RXFPDLY internal frame pulse delay register in the LINE SMART FRAMING block) coming from the STS switch fabric (TSEnx160) and maps the data to the System DROP frame alignment as specified by the DFPI and DFPDLY (in the SYSTEM SMART FRAMING block). The payload frame offset in both TUPP 9953 devices should be configured to the same value, as required by rule 2. The STS/VT Payload Processor 908 (e.g., TUPP9953) provides a frame offset register in the RSTFA block, that is used to monitor the separation between the transport frame at the line receive interface and the system drop interface of the STS/VT Payload Processor 908 (e.g., TUPP 9953 device). This value should be adjusted to be the same in both the working STS/VT Payload Processor 908 (e.g., TUPP 9953 device) and protect STS/VT Payload Processor 908 (e.g., TUPP 9953 device). This frame offset indicator register (a.k.a. offset_j0) functions to following the principle outlined in Rule 3: wall-clock time is not used. If the working system and protect system frame offset as monitored in the RSTFA are not identical, either the RXFPDLY or DFPDLY frame pulse delay register should adjusted. Such a situation can arise due to uncertainties in the sampling of the external frame pulses.

The VTPA FIFO is used for buffering tributary payload data when adapting data from the line receive interface to the system drop interface. The VTPA takes the incoming high order pointer value and forces it to a programmable payload offset (e.g., H1/H2 pointer=522) at the output of the VTPA. Both the working VTPA and protect VTPA have the same payload offset as required by Rule 2. The multi-frame phase is also set to be identical using the DTMFPI multi-frame pulse and the DTMFPI internal multi-frame pulse delay register. In one example, this is achieved by slaving both devices to the same DTMFPI pulse.

The VTPA will re-calculate the V1 and V2 (or H1/H2 TU-3 pointer bytes) values to correctly locate the tributary payload. The decision to issue a +ive or −ive justification is made every multiframe at the V4 byte locations of the system drop interface. Justifications are limited to one every 4 multiframes to remain compliant to SONET/SDH specifications.

Incoming high-order (H1/H2) pointer justifications from the RSVCA are translated down to the tributary pointer level. Because the same high order pointer values and justifications are received at each TUPP 9953 VTPA and because each TUPP 9953 VTPA performs its justification decisions at the same relative point in the data stream (as per rule 3) and because the frame offsets are identical (rule 2), the same remapping of the low order pointer values (i.e., positive or negative frequency justification) takes place on each tributary in both the working system and protect system.

Based on the spacing between the read and write pointers to the FIFO, the VTPA block issues VT pointer justifications on a per VT level. Referring to the diagram of the TUPP 9953 in FIG. 11, the negative (−ive) and positive (+ive) justification are initiated based on the distance between the read and write pointers of the VTPA FIFO. For the alignment of the tributary pointer values, the threshold levels are set as outlined in the table below.

TABLE 1

| VTPA FIFO Pointer Justification Threshold levels | |
| --- | --- |
| −ve stuff threshold | 5 |
| +ve stuff threshold | 3 |

A −ive stuff is issued when the incoming data to the FIFO is too fast for the outgoing data to be read from the FIFO. An extra byte is inserted in the outgoing frame to read data out of the FIFO at a quicker rate.

A +ive stuff is issued when the incoming data to the FIFO is too slow for the outgoing data to be read from the FIFO. One byte per frame is withheld from the outgoing frame to read data out of the FIFO at a slower rate.

These threshold settings ensure that the VTPA FIFOs in both TUPP 9953s are centered at the fill level of 4 bytes (4 byte offset between the read (RD_PTR) and write (WR_PTR) pointers). Movement of the read pointer one byte closer (3 byte distance) to the write pointer or one byte further (5 byte distance) from the write pointer results in a VT pointer justification. This fulfills Rule 5 requirement: if more that one fill level were permitted, the working system and the protect system could diverge.

The VTPA pointer justification thresholds and settings can be configured via register settings. Both working TUPP 9953 VTPA and the protect TUPP 9953 VTPA should be programmed with identical values (in TUPP 9953 these are in registers 2n60H to 2n64H) so that both the working TUPP 9953 VTPA and the protect TUPP 9953 VTPA make identical and deterministic pointer justification decisions, as per rule 4.

In addition, the TUPP 9953 PF bit in Register 3n41H: VTPA Indirect Configuration Data should be set to logic 1. Setting this bit to 1 causes the VTPA +ive and −ive pointer justification thresholds to be adjacent to the nominal fill level of 4. Any read/write pointer offset other than 4 during the V4 byte will trigger the appropriate justification in order to adjust the read/write pointer spacing back to the nominal value of 4.

As for the egress side (TSVCA), the HO pointer (H1/H2) received from the WSE device has a fixed value. Both working TSHPI and the protect TSHPI receive identical streams with the same H1/H2 values. Thus, even if there are more that one fill levels permitted in the TSVCA, this is not a problem as there should be no incoming pointer justifications. To synchronize the working TSVCA and the protect TSVCA, observe the outgoing pointer value (with THPP block Register 1n97H:THPP Extracted Pointer Value Register). If the outgoing pointer values are not identical in both the working system and protect system, issue forced pointer justifications (with the TSVCA Register 05H:SVCA-U Diagnostic and Configuration) until the payload frame offsets (H1, H2 pointer) are identical.

Various embodiments have been described above. Although described with reference to these specific embodiments, the descriptions are intended to be illustrative and are not intended to be limiting. Various modifications and applications may occur to those skilled in the art.

What is claimed is:

1. An automated method of operating a working copy of a payload processor and a protect copy of the payload processor to achieve aligned data within both the working copy hardware and the protect copy hardware of the payload processor, the method comprising:
   selecting only input data originating from a single fiber for both the working copy hardware and the protect copy hardware;
   selecting a size of a circular buffer to correspond to an integer factor of an incoming frame length of the input data for each of the working copy hardware and the protect copy hardware;
   buffering each input port of the working copy hardware and the protect copy hardware with a corresponding circular buffer;
   writing an identifiable byte to a fixed location within the circular buffers; and
   adjusting pointers for retrieving data from the circular buffers such that the identifiable byte at the fixed location is read from each circular buffer at the same time, thereby aligning the data at the outputs of the working copy hardware and the protect copy hardware of the payload processor and aligning the data within devices of different printed circuit cards comprising the payload processor such that a printed circuit card within the payload processor can be hitlessly removed for maintenance, wherein at least buffering, writing, and adjusting are performed by electronic hardware.

2. The method of claim 1, further comprising switching between data streams of the two or more payload processors using a 2:1 multiplexer, wherein said switching is performed hitlessly via the aligning of the data.

3. The method of claim 1, wherein adjusting pointers further comprises adjusting the pointers such that FIFO buffers of the payload processors are automatically maintained to the same depth.

4. The method of claim 3, wherein adjusting pointers further comprises adjusting the pointers such that the FIFO buffers of the payload processors are automatically maintained to a selected depth that does not generate pointer justifications.

5. The method of claim 3, wherein adjusting pointers is not based on an external timing reference.

6. The method of claim 3, further comprising providing an extra bit in the FIFO buffers to track the identifiable byte.

7. The method of claim 1, wherein the method is performed in an at least one of an STS switch fabric, a Virtual Tributary Payload Processor, or a VT switch fabric.

8. The method of claim 1, further comprising adjusting pointers such that output data from the working copy hardware and the protect copy hardware have STS payload frames with the same offset from their STS transport frames.

9. The method of claim 1, further comprising monitoring and adjusting offsets between transport frames in input data and offsets in transport frames in output data such that the offsets match.

10. The method of claim 1, wherein the identifiable byte comprises an identifiable byte within a SONET transport frame.

11. The method of claim 1, wherein the identifiable byte comprises a J0 byte.

12. An apparatus for alignment of at least two data streams within the apparatus, the apparatus comprising:
- a first multiplexer of the working copy hardware, the first multiplexer configured to select as input data, data originating from a working fiber or from a protect fiber;
- a second multiplexer of the protect copy hardware, the second multiplexer configured to select as input data, data originating from the working fiber or from the protect fiber;
- a first circular buffer of a size that is an integer factor of an incoming frame length of the input data, wherein the first circular buffer is configured to receive a first data stream selected by the first multiplexer, wherein the first circular buffer is in a first data path of working copy hardware;
- a second circular buffer of the same size as the first circular buffer, wherein the second circular buffer is configured to receive a second data stream selected by the second multiplexer, wherein the first data stream and the second data stream originate from the same fiber of the working fiber or the protect fiber, wherein the second circular buffer is in a second data path of protect copy hardware, wherein the working copy hardware is separate from the protect copy hardware; and
- a control circuit configured to write an identifiable byte from the receive data to a fixed location within the circular buffers, wherein the control circuit is further configured to manipulate pointers for retrieving data from the circular buffers such that data at the fixed location is read from each circular buffer at the same time, thereby aligning the data at outputs of the first data path and the second data path and within devices of different printed circuit cards of the working copy hardware and the protect copy hardware such that a printed circuit card within the payload processor can be hitlessly removed for maintenance.

13. The apparatus of claim 12, wherein the integer factor is non-trivial and does not include the frame length or the value of 1.

14. The apparatus of claim 12, further comprising a frame offset monitor configured to monitor and adjust offsets between transport frames in input data and offsets in transport frames in output data such that the offsets match.

15. The apparatus of claim 12, wherein the apparatus is embodied in a payload processor.

16. The apparatus of claim 12, wherein the identifiable byte comprises an identifiable byte within a SONET transport frame.

17. The apparatus of claim 12, wherein the identifiable byte comprises a J0 byte.

* * * * *